US010003426B2

(12) United States Patent
Jiang

(10) Patent No.: US 10,003,426 B2
(45) Date of Patent: Jun. 19, 2018

(54) WAVELENGTH CONFLICT DETECTION USING CODED PILOT TONE

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 12 days.

(21) Appl. No.: 15/336,061

(22) Filed: Oct. 27, 2016

(65) Prior Publication Data

US 2017/0244509 A1    Aug. 24, 2017

Related U.S. Application Data

(63) Continuation-in-part of application No. 15/189,330, filed on Jun. 22, 2016.

(51) Int. Cl.
*H04B 10/077* (2013.01)
*H04J 14/02* (2006.01)
(Continued)

(52) U.S. Cl.
CPC ........ *H04J 14/021* (2013.01); *H04B 10/0773* (2013.01); *H04B 10/0775* (2013.01);
(Continued)

(58) Field of Classification Search
None
See application file for complete search history.

(56) References Cited

U.S. PATENT DOCUMENTS 6,404,525 B1 * 6/2002 Shimomura ........... H04B 10/03
                                                    398/82
7,526,200 B2 * 4/2009 Nakano ................ H04B 10/506
                                                    398/10
(Continued)

FOREIGN PATENT DOCUMENTS

CN         1267979 A        9/2000
CN       103731228 A        4/2014
(Continued)

OTHER PUBLICATIONS

Min, Ping, "Study of PDM-CO-OFDM System Pilot Structure Optical Communication Technology", Dec. 31, 2015, 3 pages.
(Continued)

*Primary Examiner* — Li Liu

(57) ABSTRACT

Systems and methods for performing wavelength conflict detection are provided. These are to detect situations in optical networks where two instances of the same wavelength channel have been added. Wavelength conflict detection is performed for each of a plurality of possible wavelength channels that could be present in an optical signal, each wavelength channel that is present modulated by a pilot tone signal with a respective pilot tone frequency, the pilot tone signal carrying M-ary pilot tone data, $M=2^n$, $n \geq 1$, with a respective one of M different sequences being used to represent each of M possible data values over a data value period. Conflict detection for each wavelength channel involves performing correlation peak detection using each of the M different sequences to determine correlation peaks for each of the M different sequences, and, based on the determined correlation peaks, determining whether multiple instances of the wavelength channel are present in the optical signal.

20 Claims, 20 Drawing Sheets

(51) Int. Cl.
*H04B 10/079* (2013.01)
*H04B 10/548* (2013.01)
*H04L 5/00* (2006.01)

(52) U.S. Cl.
CPC . *H04B 10/07955* (2013.01); *H04B 10/07957* (2013.01); *H04B 10/548* (2013.01); *H04J 14/0213* (2013.01); *H04J 14/0221* (2013.01); *H04L 5/0048* (2013.01)

(56) References Cited

U.S. PATENT DOCUMENTS

| | | | | |
|---|---|---|---|---|
| 8,260,138 | B2* | 9/2012 | Schemmann | H04B 10/2537 398/158 |
| 8,798,465 | B2* | 8/2014 | Tanaka | H04Q 11/0067 385/16 |
| 9,143,260 | B2* | 9/2015 | Oyama | H04B 10/506 |
| 2009/0263125 | A1* | 10/2009 | Shen | H04J 14/0298 398/31 |
| 2014/0178065 | A1 | 6/2014 | Mertz et al. | |
| 2014/0341568 | A1* | 11/2014 | Zhang | H04J 14/0212 398/34 |
| 2015/0304052 | A1* | 10/2015 | Schemmann | H04B 10/572 398/68 |

FOREIGN PATENT DOCUMENTS

| | | |
|---|---|---|
| CN | 105164988 A | 12/2015 |
| EP | 2642676 A1 | 9/2013 |
| WO | 2015116501 A1 | 8/2015 |

OTHER PUBLICATIONS

Li, Bao, "Estimation and Compensation of Sampling Clock Frequency Offset in Coherent OFDM Systems with a Pilot-aided Method", Jan. 31, 2015, 5 pages.

Li Shiyang, "Research on Pilot-Tone Based on High Speed DWDM System Master Thesis", Jun. 30, 2013, 75 pages.

* cited by examiner

WAVELENGTH CONFLICT DETECTION USING CODED PILOT TONE

CROSS REFERENCE TO RELATED APPLICATIONS

This application is a continuation-in-part of U.S. patent application Ser. No. 15/189,330 filed on Jun. 22, 2016, and claims priority from PCT International Application No. PCT/CN2016/074144 filed on Feb. 19, 2016, the entire disclosures of which are hereby incorporated by reference.

FIELD

This disclosure relates to optical performance monitoring using pilot tones.

BACKGROUND

In optical networks, for example dense wavelength division multiplex (DWDM) systems, a plurality of channels are multiplexed. The term channel is used to refer to a wavelength channel, also known as an optical wavelength channel. In many such systems, a pilot tone is used for optical performance monitoring (OPM). The pilot tone is a small and low-frequency modulation (e.g. kHz to MHz) applied to a high-speed optical channel. A pilot tone provides an in-band ancillary channel for performance monitoring. Each channel is modulated with a different pilot tone (frequency). Accordingly, the power of a particular pilot tone can be useful for indicating the power of the high speed optical channel in a wavelength division multiplexed (WDM) system.

Some prior art systems modulate pilot tone signals with a data signal used to carry channel-characterizing information, e.g. modulation format, baud rate, source/destination. Modulating the pilot tone with channel information is useful, as the pilot tones of all the DWDM channels can be detected using a low speed detector without needing to demultiplex the DWDM signals. However, conventional pilot tone data modulation typically uses on/off keying (OOK) modulation, which means there is no power in the pilot tone signal for each zero bit of data. This means the presence of the high speed optical signal can no longer be detected for each zero bit of pilot tone data. This can be particularly problematic when there is a number of successive zero data bits in the pilot tone data signal.

Accordingly there is a need for an improved pilot tone method and system.

SUMMARY

Systems and methods for performing wavelength conflict detection are provided. These are to detect situations in optical networks where two instances of the same wavelength channel have been added. Wavelength conflict detection is performed for each one of a plurality of possible wavelength channels that could be present in an optical signal, each wavelength channel that is present modulated by a pilot tone signal with a respective pilot tone frequency, the pilot tone signal carrying M-ary pilot tone data, $M=2^n$, $n \geq 1$, with a respective one of M different sequences being used to represent each of M possible data values over a data value period. Conflict detection for each wavelength channel involves performing correlation peak detection using each of the M different sequences to determine correlation peaks for each of the M different sequences, and performing conflict detection based on the determined correlation peaks determining whether multiple instances of the wavelength channel are present in the optical signal.

Optionally, for each wavelength channel determining whether multiple instances of the wavelength channel are present in the optical signal comprises: determining how many correlation peaks for the M different sequences are collectively present in a data value period; determining that there are multiple instances of the wavelength channel present when there are two or more correlation peaks in the data value period.

Optionally, for each wavelength channel determining whether multiple instances of the wavelength channel are present in the optical signal comprises: determining a respective number of correlation peaks for the M different sequences that are collectively present in each of a plurality of data value periods; averaging the respective numbers of correlation peaks to produce an average number of correlation peaks per data value period; determining that there are multiple instances of the wavelength channel present when the average number of correlation peaks is greater than a threshold T, where T>1.

Optionally, the method further involves performing the correlation peak detection and performing conflict detection at both a first location and a second location, and determining whether a conflicting wavelength channel was added between the first location and the second location when no conflict is present at the first location and a conflict is present at the second location. The first location and the second location may, for example, be two locations within an optical add drop multiplexer node.

Optionally, the method also involves performing frequency scanning to resolve a clock frequency error between a transmitter and a pilot tone detector with conflict detection performing the correlation peak detection and conflict detection.

In some embodiments, n=2, M=4.

Another broad aspect provides a pilot tone detector. The pilot tone detector has: a photodetector for converting an optical signal to an electrical signal, the optical signal containing at least one of a plurality of possible wavelength channels, each wavelength channel that is present modulated by a pilot tone signal with a respective pilot tone frequency, the pilot tone signal carrying M-ary pilot tone data, $M=2^n$, $n \geq 1$, with a respective one of M different sequences being used to represent each of M possible data values over a data value period; an analog to digital converter for digitizing the electrical signal; a correlation peak detector that performs correlation peak detection for each of the plurality of pilot tone frequencies using each of the M different sequences to determine correlation peaks for each pilot tone frequency for each of the M different sequences; and a correlation peak processor that performs conflict detection for each wavelength channel based on the determined correlation peaks.

Optionally, the correlation peak processor is configured to: determine how many correlation peaks for the M different sequences are collectively present in a data value period; and determine that there are multiple instances of the wavelength channel present when there are two or more correlation peaks in the data value period.

Optionally, the correlation peak processor is configured to: determine a respective number of correlation peaks for the M different sequences that are collectively present in each of a plurality of data value periods; average the respective numbers of correlation peaks to produce an average number of correlation peaks per data value period; and determine that there are multiple instances of the wavelength channel present when the average number of correlation peaks is greater than a threshold T, where T>1.

Optionally, the correlation peak detector has a frequency scanner configured to perform frequency scanning to resolve a clock frequency error between a transmitter and the pilot tone detector.

Optionally, the correlation peak detector and correlation peak processor comprise a plurality of parallel processing modules, with each module responsible for correlation peak detection for one pilot tone frequency.

Another broad aspect provides an optical add drop multiplexer node (OADM node). The OADM node has a first pilot tone detector as summarized above, or describe herein, configured to receive an optical signal and determine whether there is a wavelength conflict at a first location.

Optionally, the OADM node has a second pilot tone detector configured to receive an optical signal and determine whether there is a wavelength conflict at a second location.

Optionally, the OADM node has an OADM controller configured to determine whether a conflicting wavelength channel was added between the first location and the second location when no conflict is present at the first location and a conflict is present at the second location.

Optionally, the OADM controller is configured control the OADM node so as to remove the conflicting wavelength channel when it is determined that the conflicting wavelength channel was added at the OADM node.

BRIEF DESCRIPTION OF THE DRAWINGS

Embodiments of the disclosure will now be described with reference to the attached drawings in which.

DETAILED DESCRIPTION

Conventional pilot tone data modulation uses on/off keying (OOK) modulation, which means power accuracy within a specific time period is dependent upon the proportion of "ones" and "zeroes" in the bit stream during that time period. Embodiments will be discussed which utilize a pilot-tone based QPM which provides more accurate power measurement, higher pilot-tone data rate, reliable data detection, compared to conventional OOK pilot tones. Embodiments utilize overlapping measurement windows which can allow for more reliable data detection than conventional pilot tone data detection methods. Furthermore, conventional OOK pilot tones may be not as useful and limited for loss of signal (LOS) detection, since there is no power in the pilot tone signal for each zero bit of pilot tone data, and thus LOS is indistinguishable from a zero bit of pilot tone data. Embodiments allow for the pilot tones to be used for fast LOS detection.

Figure 1:
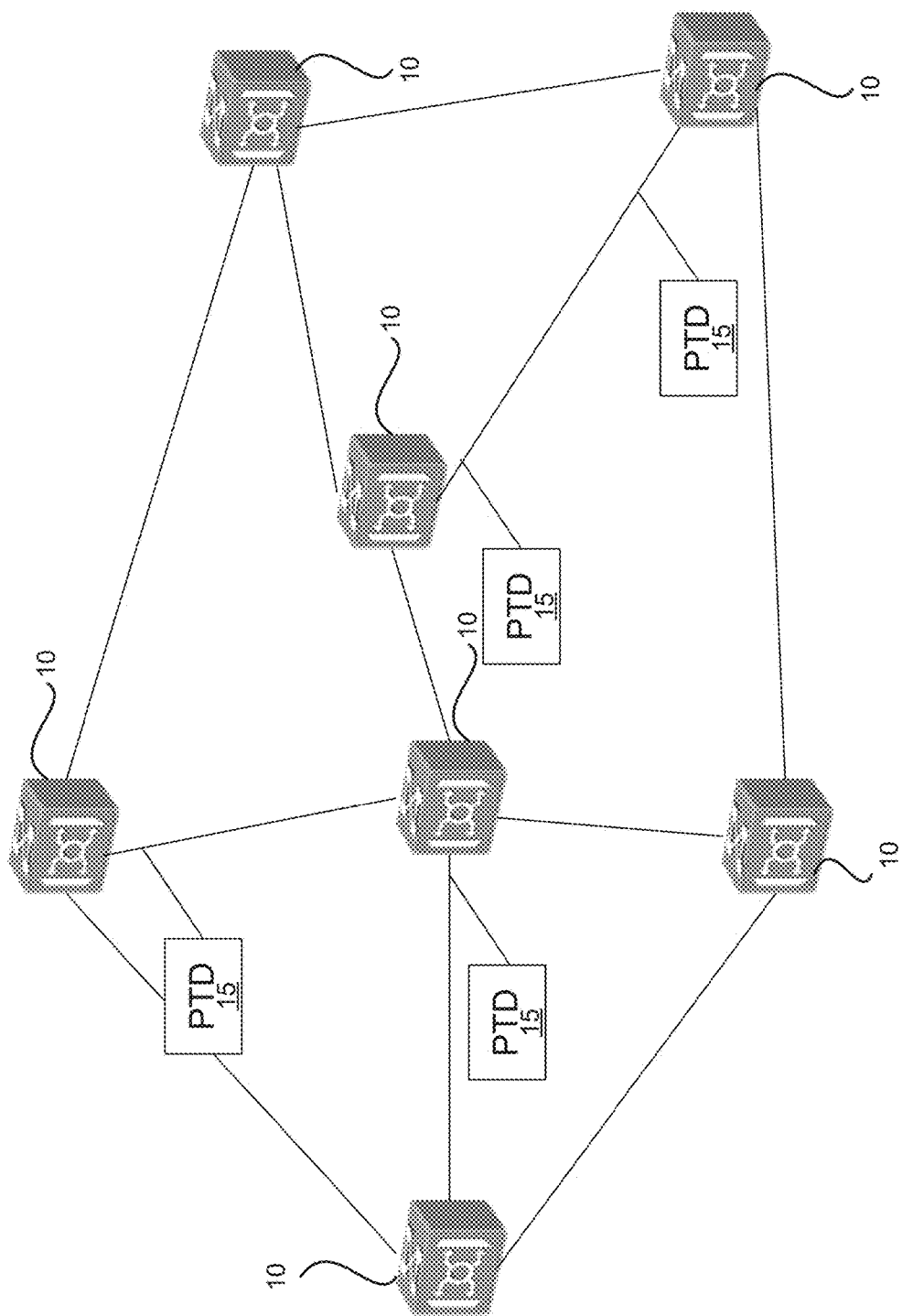
FIG. 1 illustrates an optical network having a plurality of nodes.

As depicted in FIG. 1, an optical network may have a plurality of nodes, each node including a reconfigurable optical add-drop multiplexer (ROADM) 10. A continuous pilot tone signal can be used to monitor the channel power. Such a pilot tone can be further modulated to carry channel characterizing information. The network may also include a plurality of pilot tone detectors (PTD) 15 at various locations in the optical network to monitor channel information, such as presence and optical power level of individual wavelength channels, modulation format, baud rate, and/or other channel characteristics. While not shown, it should be appreciated that each PTD 15 typically includes a low-speed photodiode, amplification circuitry, analog-to-digital converter, and a digital signal processor (DSP).

Figure 2:
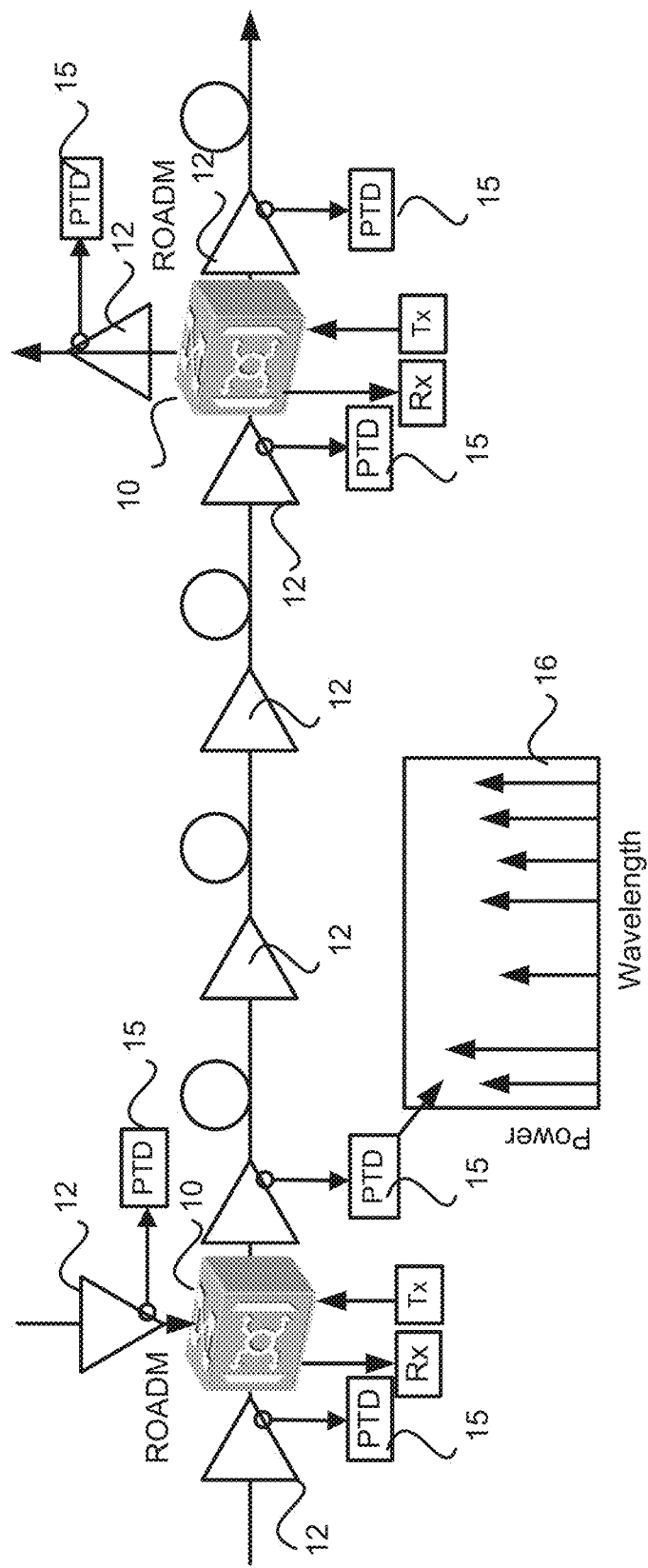
FIG. 2 illustrates more details of a link between two reconfigurable optical add-drop multiplexers (ROADMs)

FIG. 2 illustrates more details of link between two ROADMS 10. One ROADM 10 can drop one or more channels from a received DWDM signal at receivers Rx, add one or more channels generated by transmitters Tx, and pass thru other channels. In some cases dropped channels are converted from optical to electrical domains, and added channels are converted from electrical to optical domains. Otherwise, channels are switched or passed thru in the optical domain. A link between ROADMS typically includes a plurality of optical amplifiers 12 for amplifying an optical signal. Each PTD 15 can detect the pilot tones of all the DWDM channels. The power of each pilot tone can be determined e.g. by digital processing, as shown in box 16.

Figure 3:
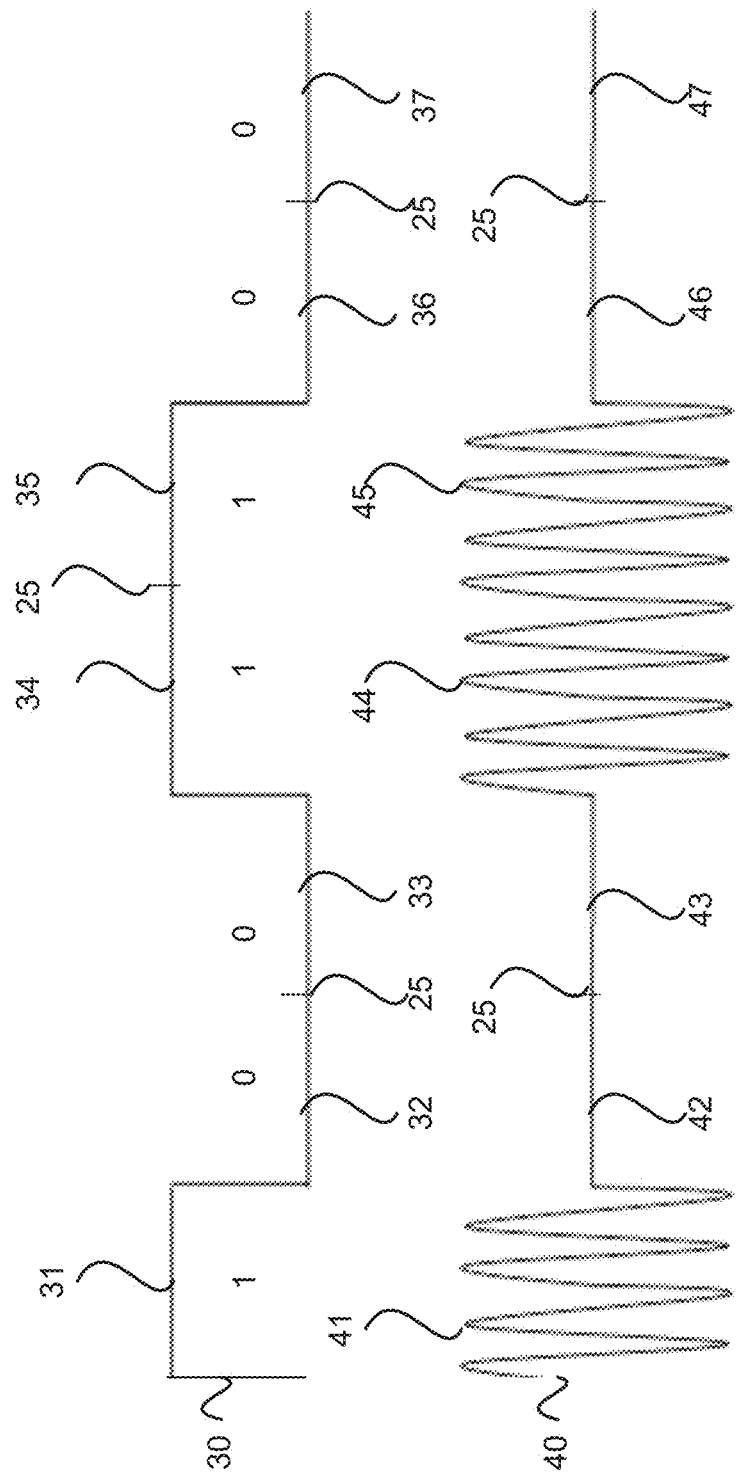
FIG. 3 illustrates the modulation of a pilot tone carrier using conventional on/off keying (OOK) modulation.

FIG. 3 illustrates the conventional on/off keying (OOK) data modulation of a pilot tone. A data bit stream 30 includes a series of bits 31-37. Bits 31, 34 and 35 are 1 bits, and bits 32, 33, 36 and 37 are 0 bits. FIG. 3 includes schematic bit dividers 25 to illustrate where one bit ends and the next bit begins, but it should be appreciated that dividers 25 do not in fact exist. The data bit stream 30 is the channel-characterizing data used to modulate the pilot tone carrier signal to produce a modulated pilot tone signal 40. Using OOK modulation each 1 bit will multiply the amplitude of the pilot tone carrier signal by 1, and each 0 bit will multiply the amplitude of the pilot tone carrier signal by 0, resulting in the signal 40. In signal 40, portions 41-47 correspond to bits 31-37. As can be seen the portions 42, 43, 46 and 47 have zero power. A problem with this approach is that during portions 42, 43, 46 and 47(corresponding to 0 bits), the PTD cannot detect the presence of the pilot tone, which can degrade the OPM process which relies on detecting the pilot tone power. As most data signals have on average an equal number of 1 bits and 0 bits, this means the pilot tone power cannot be detected half of the time (as a conventional PTD cannot detect the power for the duration of each 0 bit). Further, as the number of 0 bits for any given time period may vary a lot, the system does not provide predictable power accuracy for any small period of time. This is a problem for applications in which fast detection of the presence of the pilot tone is important, and this problem is increased for systems which utilize power averaging to suppress noise.

Stated another way, a reason for implementing pilot tones is for detecting the power for each channel. This is achieved by modulating a high speed data signal with a pilot tone carrier signal and then subsequently detecting the power of the pilot tone. In addition, some systems transmit channel information by modulating the pilot tone carrier signal with a data bit stream (which corresponds to the channel information). While using a pilot tone to transmit channel information has benefits, doing so interferes with and slows down detecting the presence of the pilot tone, and therefore the underlying high speed data signal which it modulates. However the quick detection of underlying high speed data signal is one of the reasons to use a pilot tone. Accordingly embodiments will now be discussed which mitigate this problem.

A method of modulating a high speed data signal with a pilot tone which itself carries information will now be discussed according to an embodiment. The method includes receiving data bit stream corresponding to the channel information to be carried by the pilot tone signal, the data bit stream including bit values of 1 ($b_1$) and bit values of 0 ($b_0$). The method further includes producing a coded data stream which includes a code $m_1$ for each $b_1$ and a code $m_0$ for each $b_0$ of the original data bit stream. Each code is a multiple binary sequence having multiple coding bits. Code $m_1$ is a multiple binary sequence according to a first pattern and code $m_0$ is a multiple binary sequence according to a second pattern. A pilot tone signal is then encoded with the coded data stream to produce a coded pilot tone signal. In some embodiments the encoding includes multiplying (i.e., a pilot tone signal is multiplied with the coded data stream to produce the coded pilot tone signal). The coded pilot tone signal can then be used to modulate the high speed data signal. Such a coding scheme can be deciphered by a suitably configured PTD to recreate the data bit stream such that the signal will have a detectable power during both $b_1$ and $b_0$ bits.

Some embodiments structure the modulation code sequence to help the PTD recover the pilot data bit stream. Methods for decoding the modulated pilot tone signal will be discussed below. Very briefly, some embodiments select the modulation scheme to take into account factors such as a lack of training sequence and the fact that the receiver clock will not be synchronized to the pilot tone transmitter clock (because the channels (each carrying its own pilot tone) may come from different nodes in the optical network).

In some embodiments, each pilot tone data bit ($b_1$ or $b_0$) has a duration of $T_{PT}$ and each code ($m_1$) and ($m_0$) has a duration $T_{Code}$ such that $T_{PT}=(1+F)T_{Code}$ where 0<F. The coded data stream includes one complete code (m1 or m0) and a repeated beginning portion of the code for each pilot-tone data bit, with the length of each repeated portion being $F \times T_{Code}$. Code $m_1$ is a multiple binary sequence according to a first pattern and code $m_0$ is a multiple binary sequence according to a second pattern. In some embodiments, each code ($m_1$) and ($m_0$) can be based on a pseudo random bit sequence (PRBS), although it will be appreciated that other equivalent or suitable codes may be utilized. In some embodiments, F≤1 to improve efficiency. The number of measurements in each pilot-tone bit is (1+F)/F. Keeping this number small has the benefit of minimizing the processing resources. On the other hand, the pilot-tone data efficiency is proportional to 1/(1+F). In some embodiments F is approximately ¼ which is a compromise between these factors.

Mathematically the optical power with this kind of pilot-tone can be described as $$I(t)=I_0(1+f_C(t)m\ \sin(\omega_{Pt}t))$$

where $f_C(t)$ is the applied code function, including code m1 for bit1 and m0 for bit0; $\omega_{PT}$ is the pilot-tone circular frequency, and m is the modulation depth.

Figure 4:
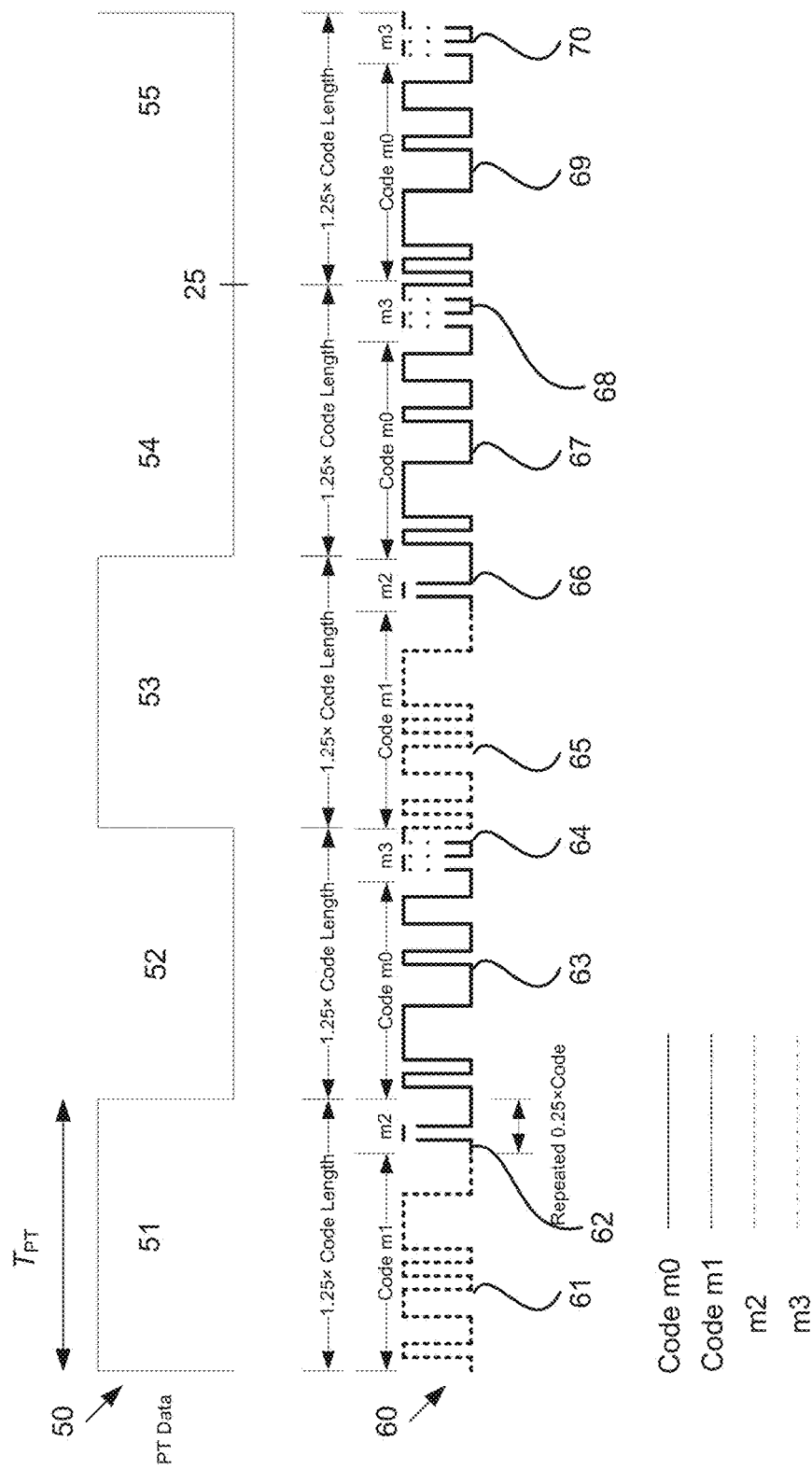
FIG. 4 illustrates an example data bit stream and corresponding modulation code stream, according to an embodiment.

FIG. 4 illustrates an example data bit stream and corresponding coded data stream, according to an embodiment. In this example, F=0.25, such that PT bit duration equals 1.25× code length, and the step size is 0.25× code length. FIG. 4 includes a PT data bit stream 50 including bits 51-55, with separator 25 again just to show separation of two successive 0 bits but not being present. As stated, in this example, $T_{PT}$=1.25× the code length. Accordingly, the corresponding coded data stream 60 has each bit replaced with the corresponding code, plus a repeated beginning portion of 0.25× the code length. Accordingly each 1 bit is replaced by code $m_1$ plus repeated beginning portion m2 and each 0 bit is replaced with code $m_0$ and repeated portion m3. Code $m_1$ is shown in dotted lines and code $m_0$ is shown in solid line, as indicated in the legend at the bottom of the figure, which also shows the line types for m2 and m3. In some embodiments each code includes $2^7-1$ code sequences, which provides a compromise between improving discrimination (improved by longer sequences) and decreasing the computation complexity.

Accordingly the data bit stream 50 is converted into the coded data stream 60 which includes code $m_1$ 61 and repeated portion m2 62 replacing bit 51; code $m_0$ 63 and repeated portion m3 64 replacing bit 52; code $m_1$ 65 and repeated portion m2 66 replacing bit 53; code $m_0$ 67 and repeated portion m3 68 replacing bit 54; and code $m_0$ 69 and repeated portion m3 70 replacing bit 55.

Figure 5:
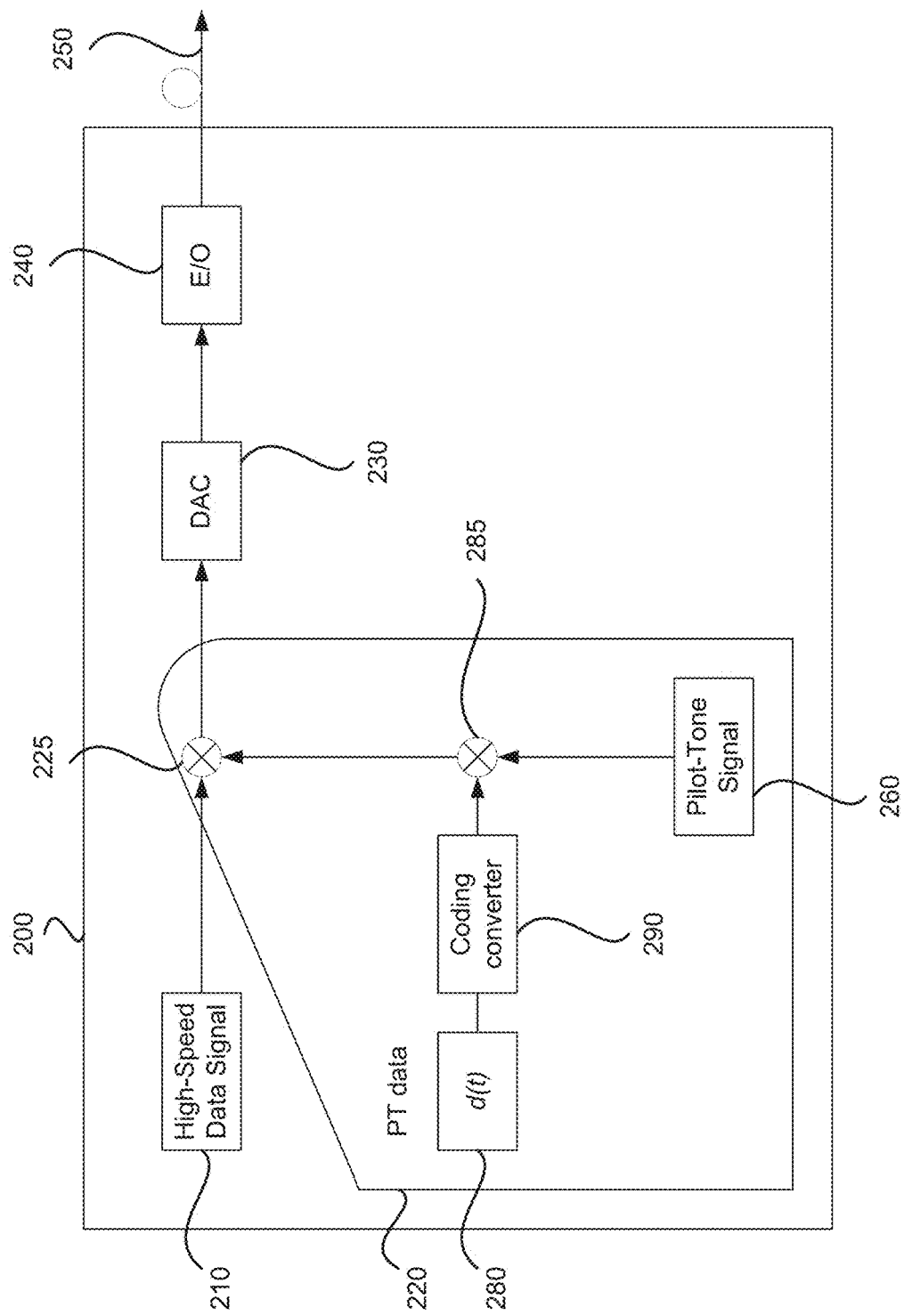
FIG. 5 is a block diagram illustrating an optical transmitter including a pilot tone modulator, according to an embodiment.

FIG. 5 is a block diagram illustrating an optical transmitter including a pilot tone generator, according to an embodiment. In the embodiment depicted by way of example in FIG. 5, an optical transmitter 200 includes a high-speed data signal input 210, a pilot-tone generator 220, a digital-to-analog (DAC) converter 230 and an electrical-to-optical (E/O) converter 240. The optical transmitter transmits the modulated optical signal over an optical link 250. It should be appreciated that for some optical systems there may be multiple modulator units 220 for each E/O converter 240. For example, for a coherent transmitter, there are 4 data streams: an I and Q phase for each X and Y polarization. Accordingly such a transmitter would include four generator blocks 220. Typically in such a system the DAC would have 4 outputs for a single E/O converter 240.

In the embodiment illustrated in FIG. 5, the pilot tone encoder 220 includes a pilot tone frequency generator 260 for generating a pilot tone carrier signal and a PT data generator 280 for producing a data bit stream d(t) to be carried by the pilot tone. In other embodiments the generator 280 is replaced by a receive interface which receives the PT data bit stream from another module. The PT data bit stream is passed to coding converter 290 which converts the data bit stream into a coded data stream as discussed. The generator 220 also includes a multiplier 285 for multiplying the coded data stream with the pilot tone signal, and a second multiplier 225 to modulate the pilot tone onto the high-speed data signal. It is noted that the generator 220 in this embodiment operates in the digital domain to produce a coded pilot-tone signal which subsequently encodes the high-speed data signal, again in the digital domain prior to DAC and E/O. However, as this has the effect of modulating an optical high-speed data signal with the coded data stream, and indeed alternative embodiments could physically modulate an optical signal with the coded data stream, the term modulation is used. Note that in the transmitter 200, there may be more than one high speed data/DAC path, as discussed above.

Figure 6:
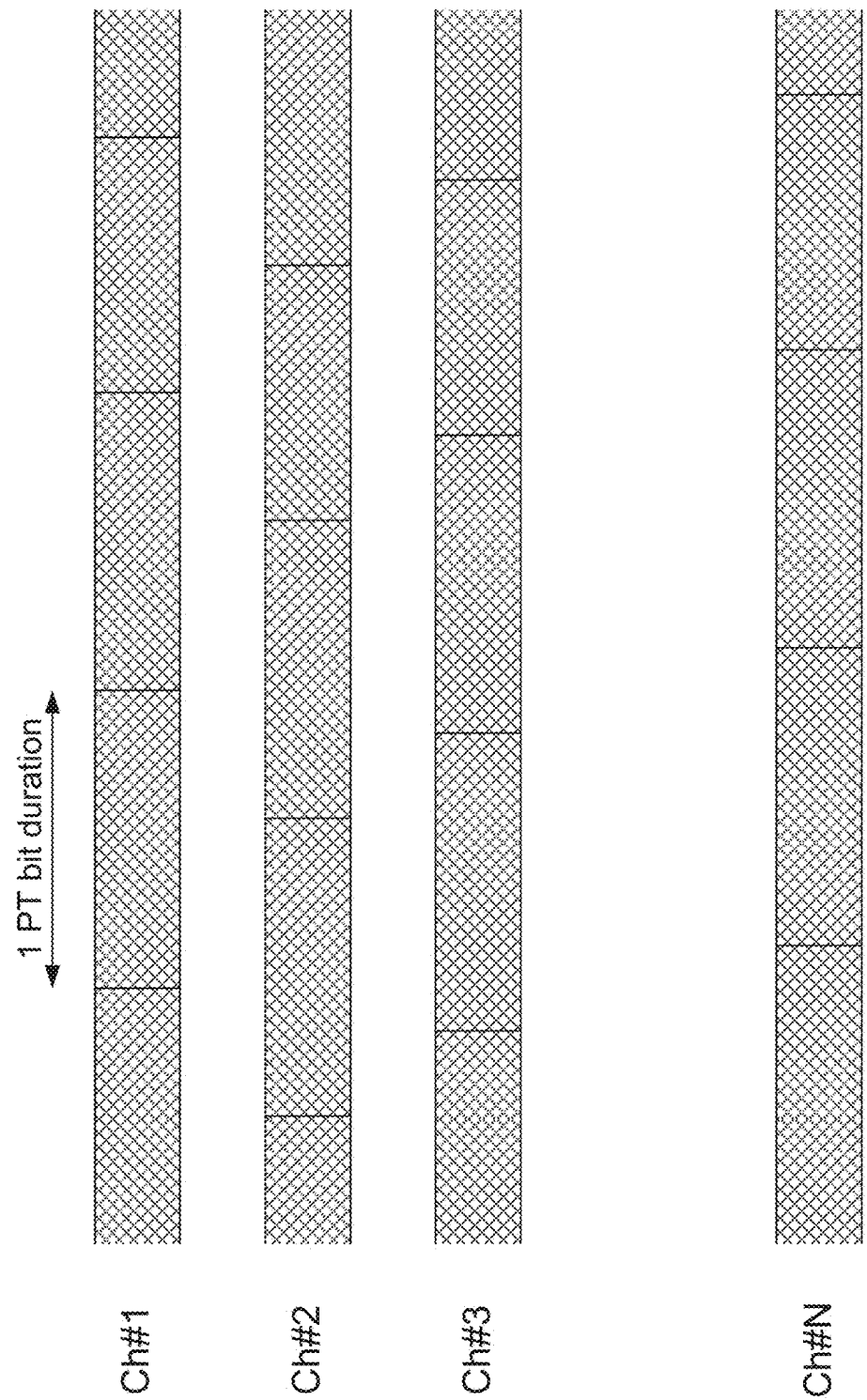
FIG. 6 illustrates multiple PT channels, according to an embodiment.

FIG. 6 illustrates some of the challenges a PTD must overcome when trying to detect multiple pilot-tones of DWDM channels. FIG. 6, shows each PT bit duration being offset (e.g., beginning time for each PT bit duration is different) due to the channels not being synchronized, which may result from different channels entering the network from different nodes. Further the pilot-tone bit duration between channels can vary slightly due to different clock frequencies in the transmitters which produced each channel.

The detected signal usually contains many channels, each having a pilot tone of unique frequency. The following description describes an example of the detection of one pilot tone. It should be appreciated that such a process can be performed for each pilot tone of interest. Also the detection algorithm described here assumes the pilot-tone carrier frequency is removed, which can be done for example by frequency down conversion.

Figure 7:
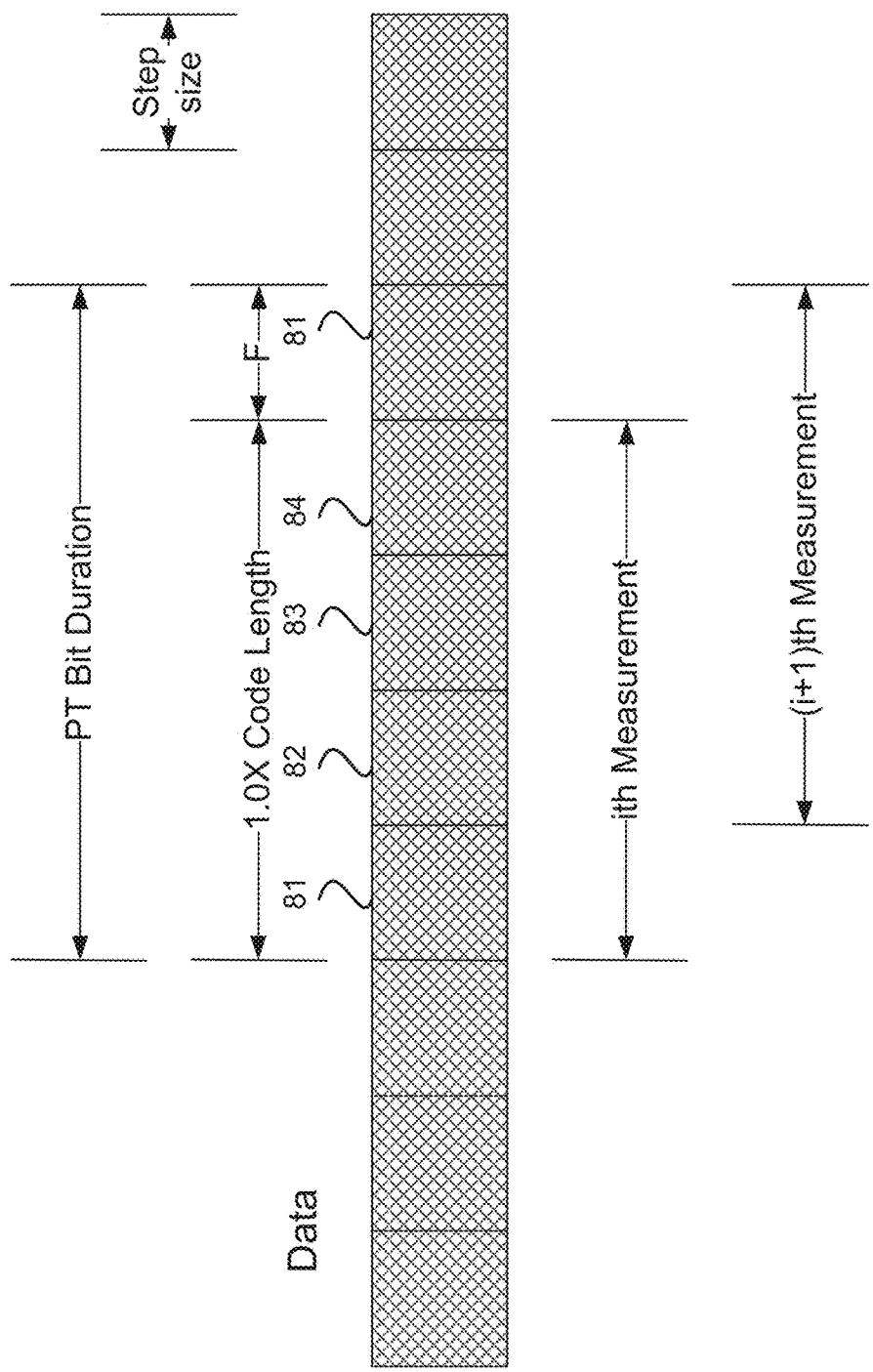
FIG. 7 illustrates a pilot tone decoding method according to an embodiment.
Figure 8:
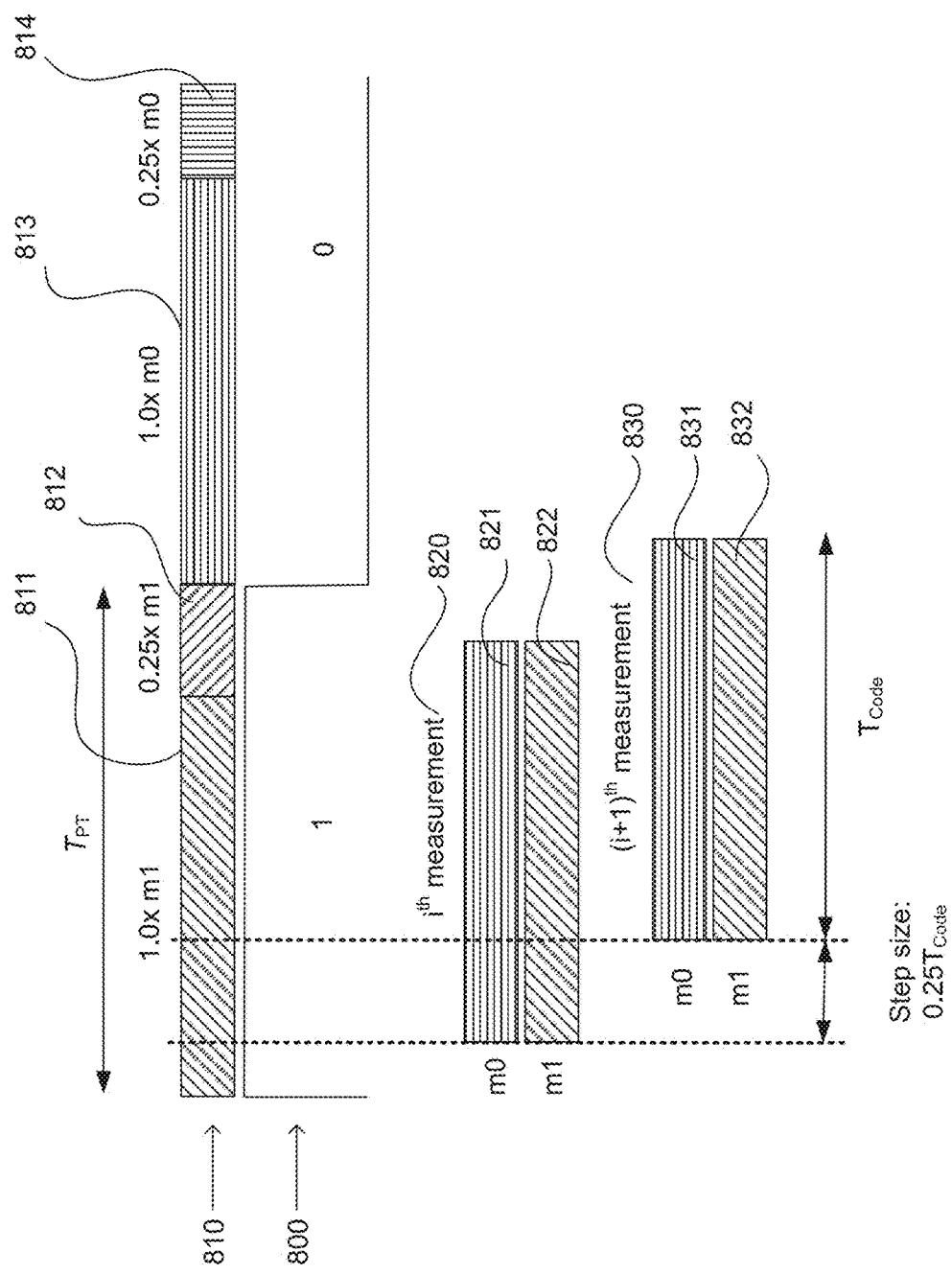
FIG. 8 illustrates further details of a pilot tone decoding method according to an embodiment.

FIG. 7 illustrates a pilot tone detection method according to an embodiment. FIG. 7 shows a received pilot-tone signal, for example by PTD 15 at the pilot-tone frequency; i.e., extracted from the high speed data signal with the PT applied. FIG. 7 illustrates a pilot-tone detection method in order to measure the PT power and extract the PT data bit stream information carried by the PT. However, there is no simple mechanism to let the receiver know where each code begins (for different pilot tones, their corresponding codes may begin at different times). Accordingly multiple measurements are made window by window for each PT data bit. Of course, a single measurement of a pilot signal time trace may be sliced into multiple overlapping windows for subsequent digital processing. For simplicity, the term "multiple measurements" is to be understood as including cases where the single measured time trace is separated into multiple overlapping windows. The length of each measurement window equals the code length $T_{code}$, and the time step size is equal to $F*T_{Code}$, which means the adjacent measurement windows are partially overlapped, and offset by the step size. The number of measurements in a PT data bit is (1+F)/F. With this number of measurements, there is at least one measurement that contains a complete code within a PT data bit duration. In the example shown, corresponding to the example shown in FIG. 4, F=0.25, the PT bit duration equals 1.25× code length, and the step size is 0.25× code length. Accordingly the partially overlapping measurements are each offset by 0.25× code length. Therefore there are 5 measurement windows for each PT bit duration, as (1+0.25)/0.25=5. Accordingly each PT bit duration can be considered to have 5 segments (segments 81-84 plus repeated segment 81). Each of the measurements includes 4 segments and each successive measurement shifts by one of those segments. Over the 5 measurements, usually one measurement contains a complete code (if the measurement window happens to be aligned with the PT bit, then there are two measurements containing a complete code). FIG. 8 illustrates further details of a pilot tone detection method according to an embodiment. FIG. 8 illustrates using cross-correlation between PT encoded signal and each of the two detection codes ($m_1$ and $m_0$). A data bit stream 800 is encoded to form a coded pilot tone signal 810 using code sequence $m_1$ 811 and $m_0$ 813, along with repeated portions $m_2$ 812 and $m_3$ 814. For the $i^{th}$ measurement 820, two powers are obtained after being decoded by code $m_0$ 821 and $m_1$ 822, and expressed as $Pm_0(i)$ and $Pm_1(i)$, respectively. Similarly, for the $(i+1)^{th}$ measurement 830, two powers $Pm_0(i+1)$ and $Pm_1(i+1)$ are obtained after the decoding. Circular cross-correlation is used to detect the pilot-tone power at each measurement. If a measurement window contains a complete code sequence for m1 or m0, then the detected m1 power (decoded using m1) or m0 power (decoded using m0) has a measurement at the full power level. However, if the measurement window only contains a portion of the m1 or m0 code sequence, then the detected m1 power or m0 power has a measurement less than the full power level.

Figure 9:
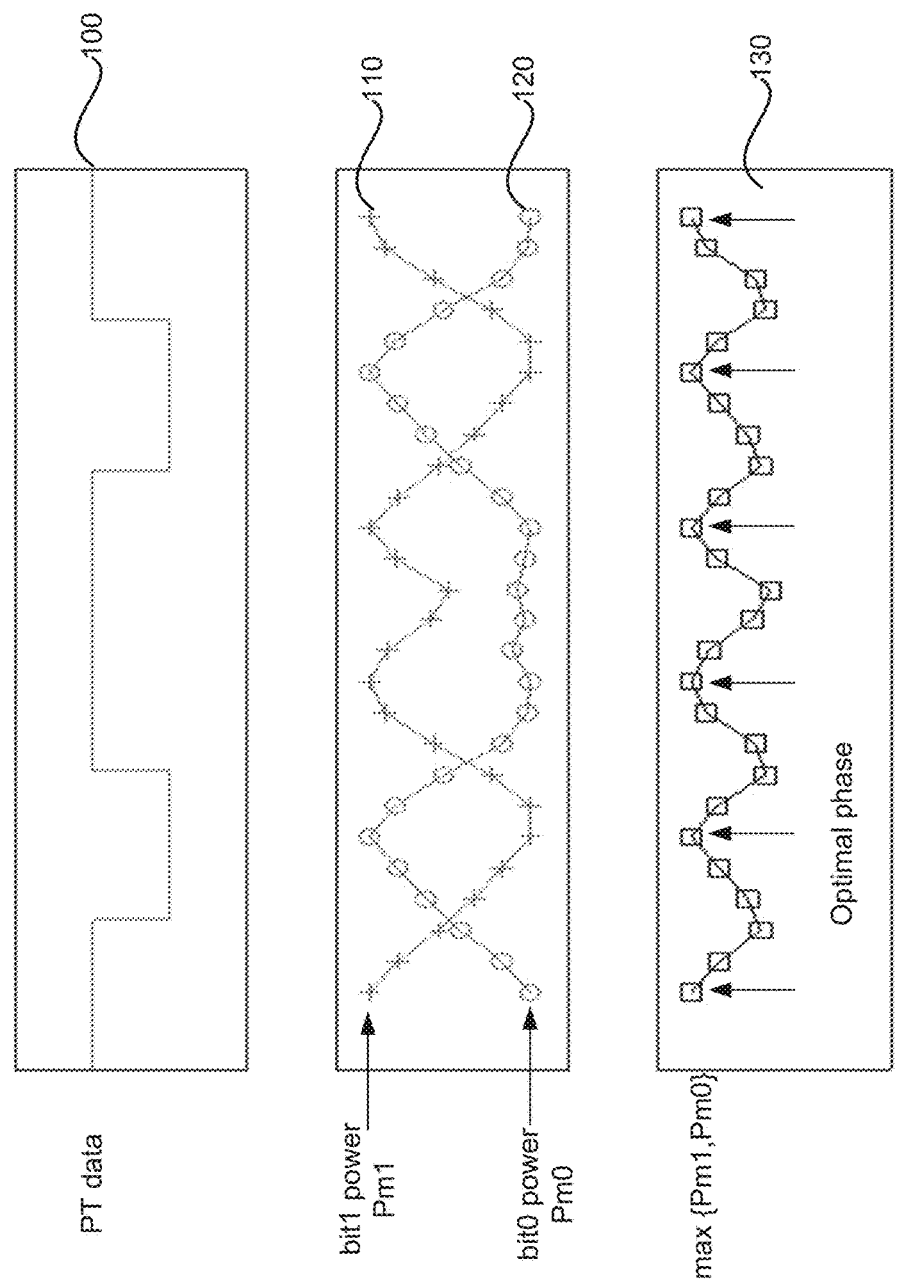
FIG. 9 illustrates a phase detection method according to an embodiment.

In this example, once 5 measured pilot-tone power readings are made for every pilot-tone data bit (i.e., 5 measurement window power measurements are made), the method determines the actual pilot tone power, and then recovers the pilot-tone bits. In order to do so, the system selects one of the 5 measurements as the correct measurement to use, in a process referred to as phase detection. FIG. 9 illustrates decoded powers and corresponding optimal phase according to an embodiment. Accordingly for a PT data stream 100, FIG. 9 illustrates a plot of bit 1 power measurements ($Pm_1$) in curve 110 and bit 0 power measurements ($Pm_0$) in curve 120. Intuitively by looking at these two curves, the peaks of each curve indicate whether the bit is a 1 or 0. For an automated method, an optimal sampling phase is determined in order to obtain correct PT power. Curve 130 illustrates how the peak location of max{Pm1,Pm0} corresponds to the optimal bit sampling phase.

Figure 10:
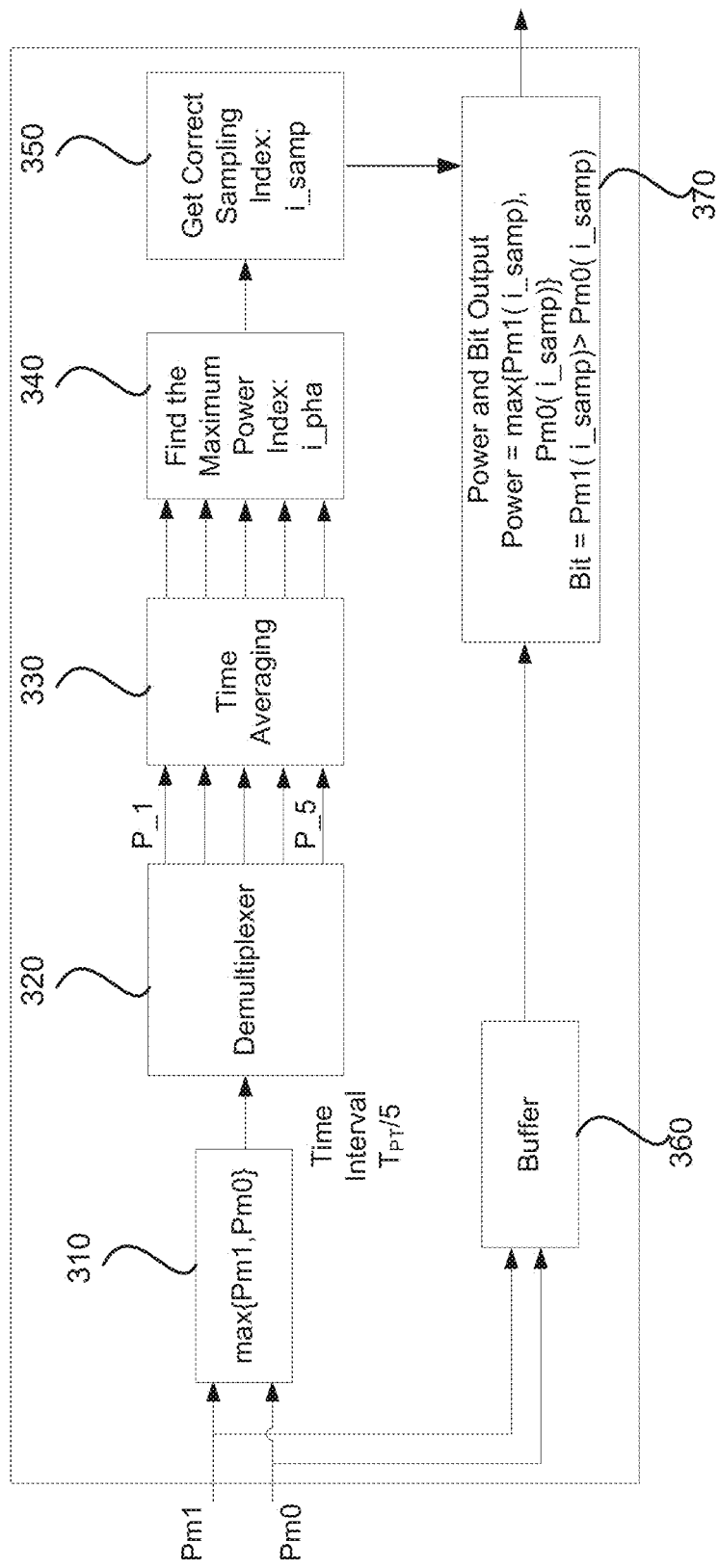
FIG. 10 is a block diagram illustrating a phase selection method according to an embodiment.

FIG. 10 is a block diagram illustrating a phase selection method according to an embodiment. The maximum power of Pm0(i) and Pm1(i) at 310 is demultiplexed by demultiplexer 320 into 5 paths P_1 . . . P_5. After time averaging 330 for suppressing noise, the index of the maximum power of the five paths (i_pha) is obtained 340, wherein i_pha is an integer between 1 to 5 representing the optimal phase index. The optimal sampling index (i_samp) can be obtained based on the optimal phase i_pha at step 350.

The optimal sampling phase is used to sample the $Pm_1$ and $Pm_0$ readings from buffer 360 to determine the correct power and bit output at 370. Power for each bit is obtained using Power=max{Pm1(i_samp), Pm0(i_samp)}, noting that with the use of codes m1 and m0, each portion of the PT modulated signal representing a bit has a non-zero power, even for the 0 bits.

Once the best measurement (for each bit) is detected, it is converted to the corresponding bit to recover the original data bit stream. Accordingly, embodiments then produce an output data bit stream. In the embodiment shown, the bit decision is made by comparing the powers Pm1(i_samp) and Pm0 (i_samp), respectively. Accordingly:

if Pm1(i_samp)>Pm0(i_samp), then the system outputs a 1 bit; and if Pm1(i_samp)<Pm0(i_samp), then the system outputs a 0 bit.

Figure 11:
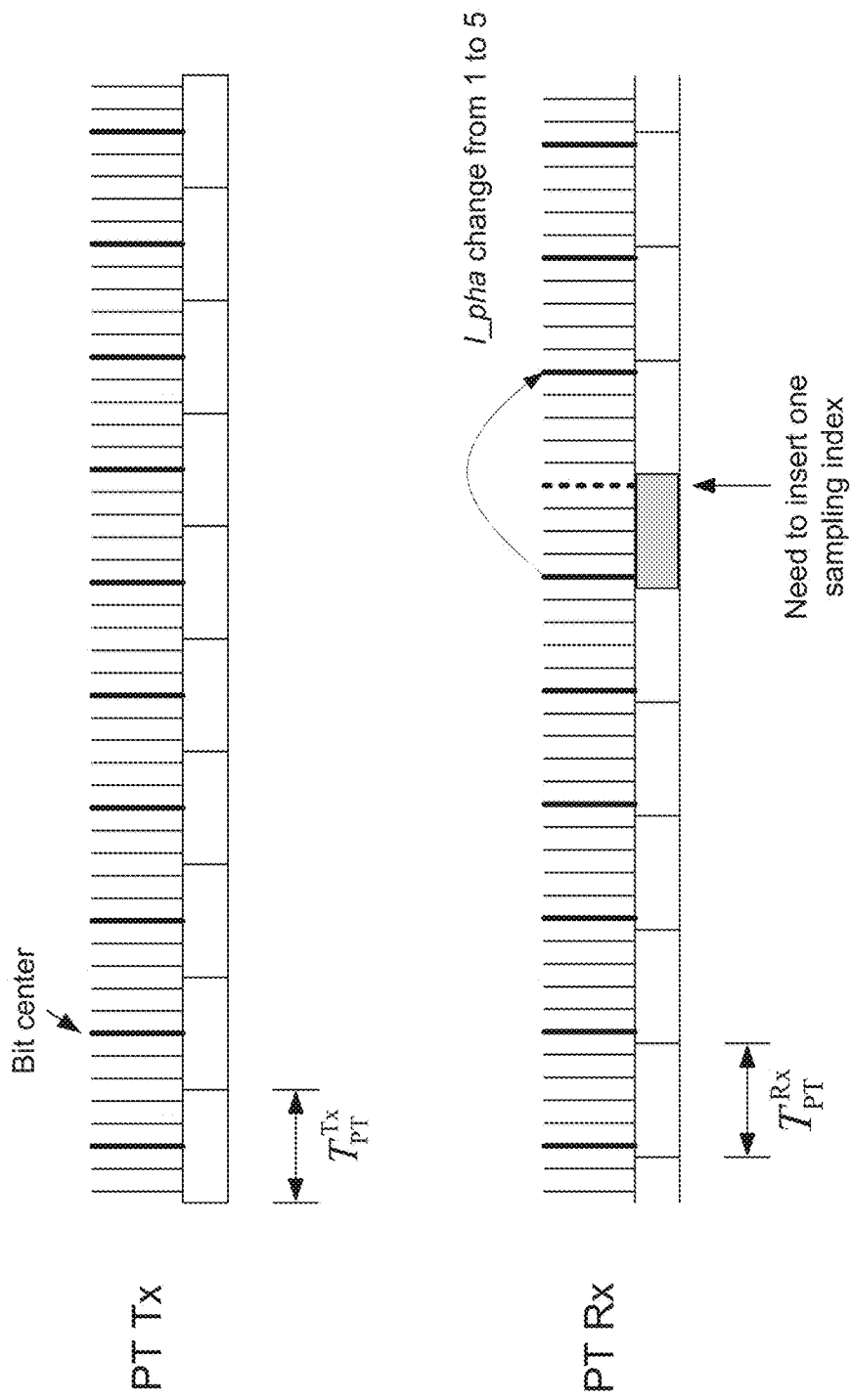
FIG. 11 illustrates why inserting a phase sampling index is required when the Rx clock frequency is slower than the Tx clock according to an embodiment.
Figure 12:
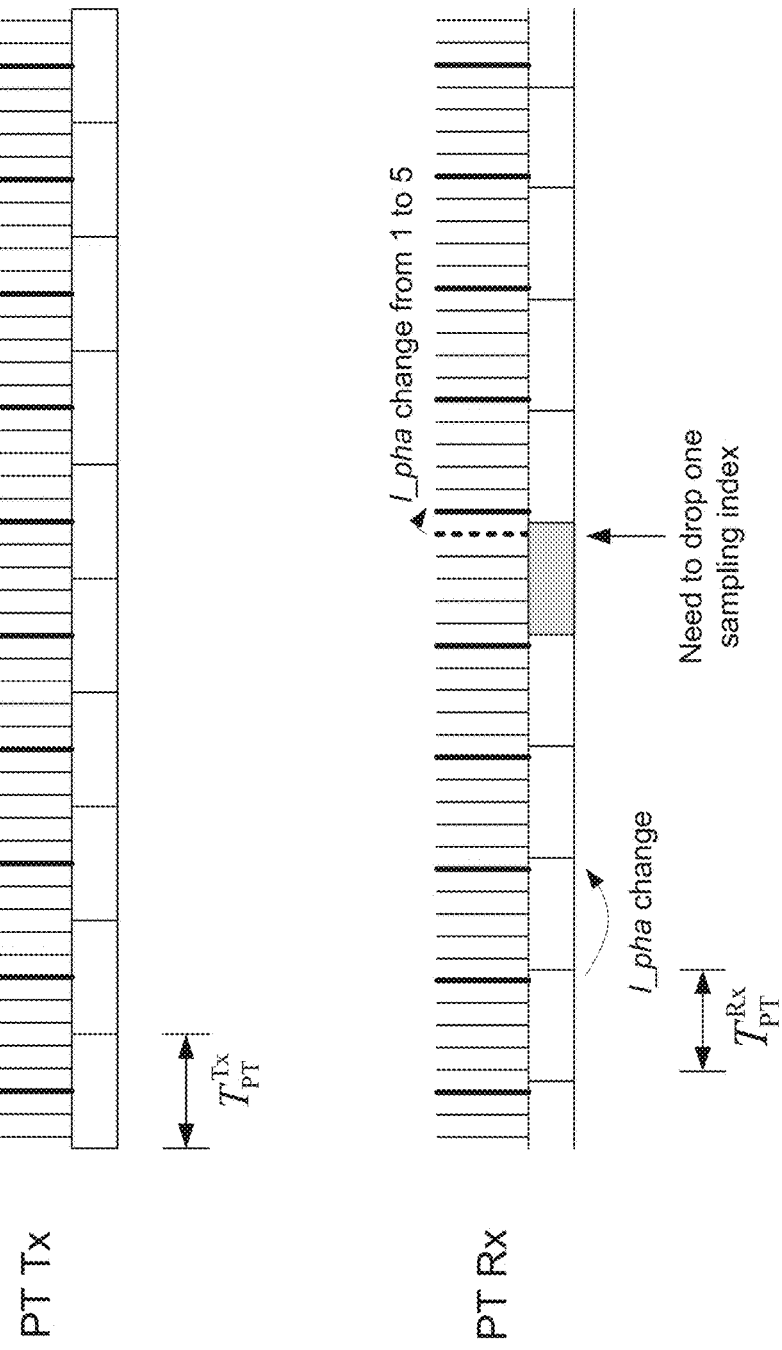
FIG. 12 illustrates why dropping a phase sampling index is required when the Rx clock frequency is faster than the Tx clock according to an embodiment.

If there's a clock difference between pilot-tone Tx and Rx clocks, the optimal phase i_pha will change gradually with time. If i_pha changes directly from 1 to 5 or from 5 to 1 (i.e., not through 2,3,4 or 4,3,2), one sampling index i_samp should be added or dropped to prevent slips. FIGS. 11 and 12 illustrate such a method, according to an embodiment. In both figures the bold vertical line indicates the optimal phase. The optimal sampling index i_samp should be the closest one to the Tx optimum phase. The empty blocks indicate PT data bit durations. Each bit has 5 measurements; correspondingly, each block contains 5 vertical lines. The bold vertical lines indicate the optimum phases.

FIG. 11 illustrates why inserting a phase sampling index is required when the Rx clock frequency is slower than the Tx clock according to an embodiment. If i_pha changes directly from 1 to 5, one sampling index should be added. When Rx clock frequency is slower than the Tx clock, the Rx bit duration is slightly larger than Tx bit duration. Correspondingly, the intervals of the vertical lines at Rx side are slightly larger than that of Tx. At the first bits, the optimum phase is 1. Then for the shaded block, there are two possible optimum phases (1 or 5) according to the Tx optimum phases. However, for one particular bit duration, only one optimal phase is selected based on the scheme shown in FIG. 10. For example, phase 1 is selected as the optimum phase for this block. Then the optimum phase at the next block is 5. Therefore, one optimal sampling phase is missed. In this case, one sampling phase index should be added, as shown in the dashed line.

FIG. 12 illustrates why dropping a phase sampling index is required when the Rx clock frequency is faster than the Tx clock according to an embodiment. If i_pha changes directly from 5 to 1, one sampling index should be dropped.

Figure 13:
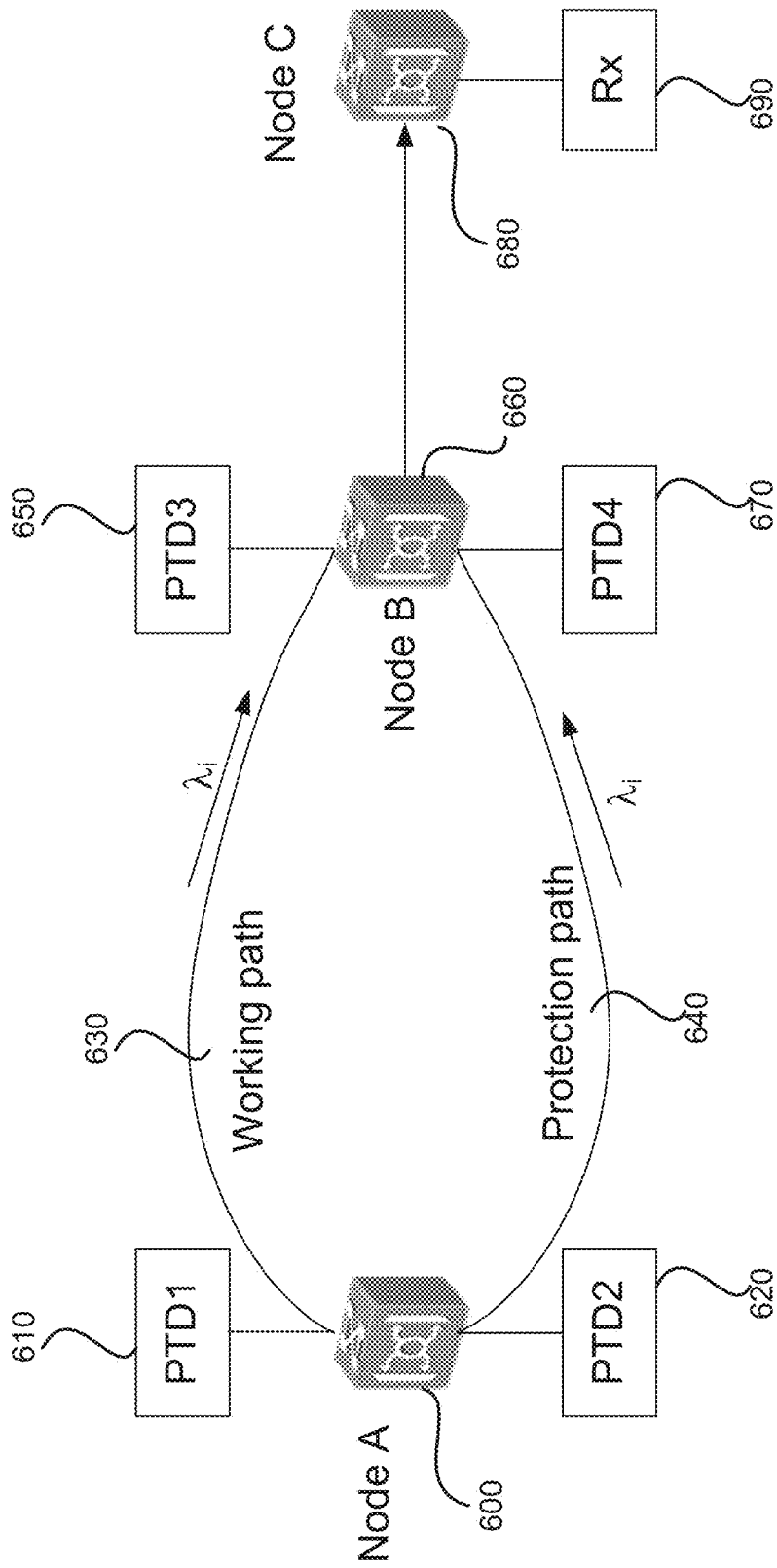
FIG. 13 illustrates a Loss of Signal (LOS) application according to an embodiment.

FIG. 13 illustrates a LOS application according to an embodiment. FIG. 13 illustrates Node A 600 and Node B 660 with working path 630 and protection path 640 used to transport a signal with wavelength $\lambda_i$. Four PTDs are illustrated, PTD1 610, PTD2 620, PTD3 650 and PTD4 670. Each PTD can include a low-speed photodiode and a digital signal processor (DSP) or other processing system which (includes a processor and machine readable memory storing instructions which when executed by the processor) implements the pilot tone decoding methods discussed herein. The figure also illustrates Node C 680 is actually the node with receiver 690 designated to receive channel $\lambda_i$. Accordingly, although both the working path 630 and protection path 640 connect through Node B 660, Node B 660 only acts a pass-thru node for channel $\lambda_i$. For optical layer protection/restoration, it is important to detect optical channel LOS as quickly as possible. Traditionally, the receiver Rx is used for LOS detection, where a signal is broadcast from a Tx on both the working and protection paths and a selector at the Receiver determined if a protection switch should be made (ie., selects which of the protection and working paths to receive). In other words, for conventional systems the Rx must be at the same node with the selector.

However, embodiments provide sufficiently quick LOS detection that a PTD can now be used as a part of a selector. For example, if PTD3 650 detects a LOS of channel $\lambda_i$ in the working path 630, then Node B 660 (which can include PTD 3 650) can select the channel $\lambda_i$ in the protection path 640. In such a system, the Rx does not have to be at the same node with the selector.

Figure 14:
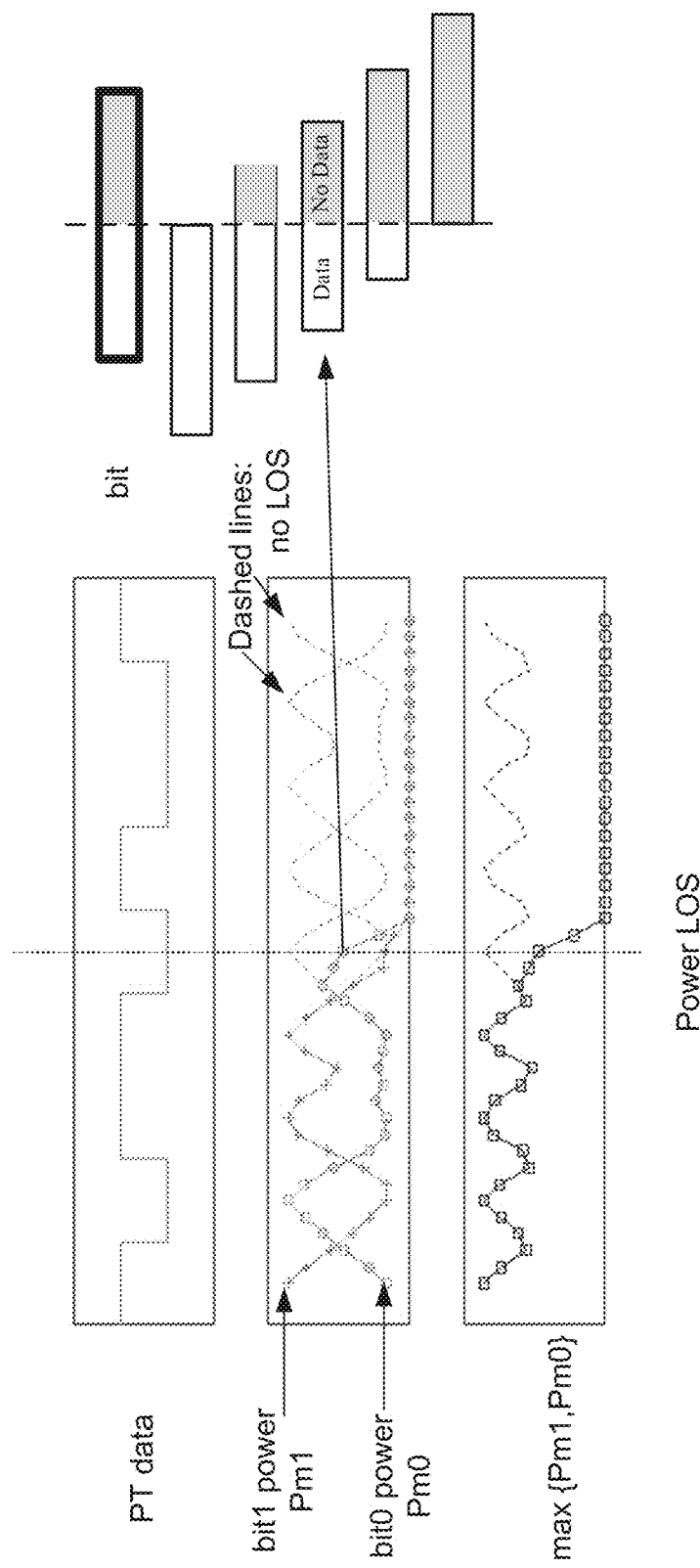
FIG. 14 illustrates detecting a LOS according to an embodiment.

FIG. 14 illustrates detecting a LOS according to an embodiment. Unlike in conventional systems, in which the absence of power in the PT signal (e.g. Portions 42 and 43 in FIG. 3) indicates a zero bit, and therefore does not indicate a LOS condition, embodiments using the methods and systems can determine an LOS immediately even in the middle of a 0 bit. As can be seen in FIG. 14, which is similar (initially) to FIG. 9, power can be detected for each bit in the PT signal, even the 0 bits. Accordingly when a Power LOS occurs (as marked by the vertical line) the bit power curves for both $Pm_1$ and $Pm_0$ immediately drop when the LOS occurs, as does the value of max{Pm1,Pm0}. When this occurs a LOS condition to be declared. Appropriate signaling can be made in response, for example to trigger protection switching.

Various embodiments have been described in which coded pilot tones are used to identify wavelength channels and carry basic signaling data. In some systems, there may be a possibility that the same wavelength has been added twice, such that two channels with the same wavelength appear on the same fiber. When this occurs, there is a wavelength conflict.

Figure 15:
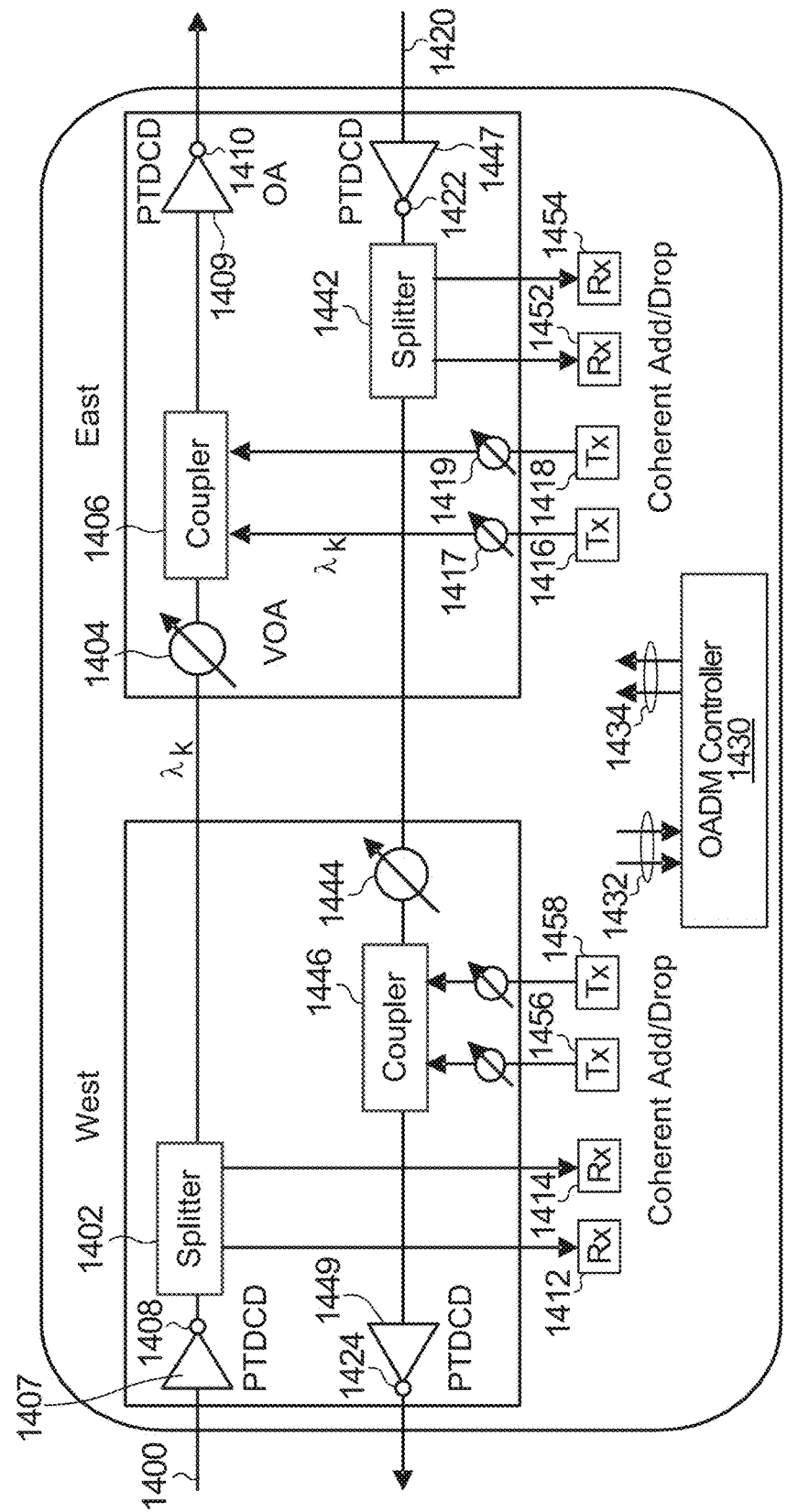
FIG. 15 is a block diagram of an OADM including pilot one detectors with conflict detection.

Further embodiments provide systems and methods for detecting such conflicts. An example situation that might lead to a wavelength conflict will be described with reference to FIG. 15 which shows a simplified block diagram of an OADM node with pilot tone detectors with conflict detectors (PTDCD) in accordance with an embodiment of the invention. The OADM node of FIG. 15 uses couplers to add/drop channels.

For west-east fiber 1400, there is an amplifier 1407, and optical splitter 1402 for dropping wavelength channels for reception by optical receivers 1412, 1414, e.g. coherent receivers including photodiodes and local oscillator (LO) lasers, not shown. A through signal from the splitter 1402 is passed on to a variable optical attenuator (VOA) 1404 which applies a variable attenuation to the through signal. The VOA 1404 is connected to an optical coupler 1406 for adding channels to the through signal from transmitters 1416, 1418, after variable attenuation in VOAs 1417, 1419. The signal is amplified in an optical amplifier 1409 before being sent out on the fiber. Also shown are PTDCDs 1408 and 1410 for performing pilot tone detection on west-east fiber 1400 at the input and output of the OADM node, and for performing conflict detection, as detailed below. The PTDCDs in the illustrated example are shown as circles at the output of the optical amplifiers. A PTDCD may be located at an input or output of an optical amplifier, or the amplifier output can be tapped and detected by a PTDCD. PTDCDs may also or alternatively be situated elsewhere than at the output of an amplifier.

Similar functionality is shown for east-west fiber 1420, including optical amplifiers 1447 and 1449, PTDCDs 1422, 1424, a splitter 1442, a coupler 1446, a VOA 1444, transmitters 1456 and 1458 and receivers 1452 and 1454.

During a normal operation, the added channels will be at wavelengths not used upstream of the optical coupler 1406. However in case of an error, an added channel may have the same wavelength as an existing pass-through channel. By way of an illustrative example, for the west-east fiber 1400, there is a wavelength channel having wavelength $\lambda_k$ on the through channel output by splitter 1402 that is input to coupler 1406, and another wavelength channel having the same wavelength $\lambda_k$ is being added by optical transmitter 1416. As such, there is a conflict situation as there are two channels with the same wavelength on the same fiber.

Also shown is an OADM controller 1430 having inputs 1432 and control outputs 1434. The connections between the OADM controller 1430 and the remainder of the OADM are not shown in the interest of simplicity. However, the inputs may, for example, include correlation peak information and/or conflict detection results from one or more of the PTDCDs 1408, 1410, 1422, 1424. Control outputs may, for example, control one or more of the variable optical attenuators in the OADM. Pilot tone detection and conflict detection is performed in PTDCDs 1408, 1410, 1422, 1424. A detailed example implementation and functionality of a PTDCD is described below with reference to FIGS. 19 and 20.

Figure 16:
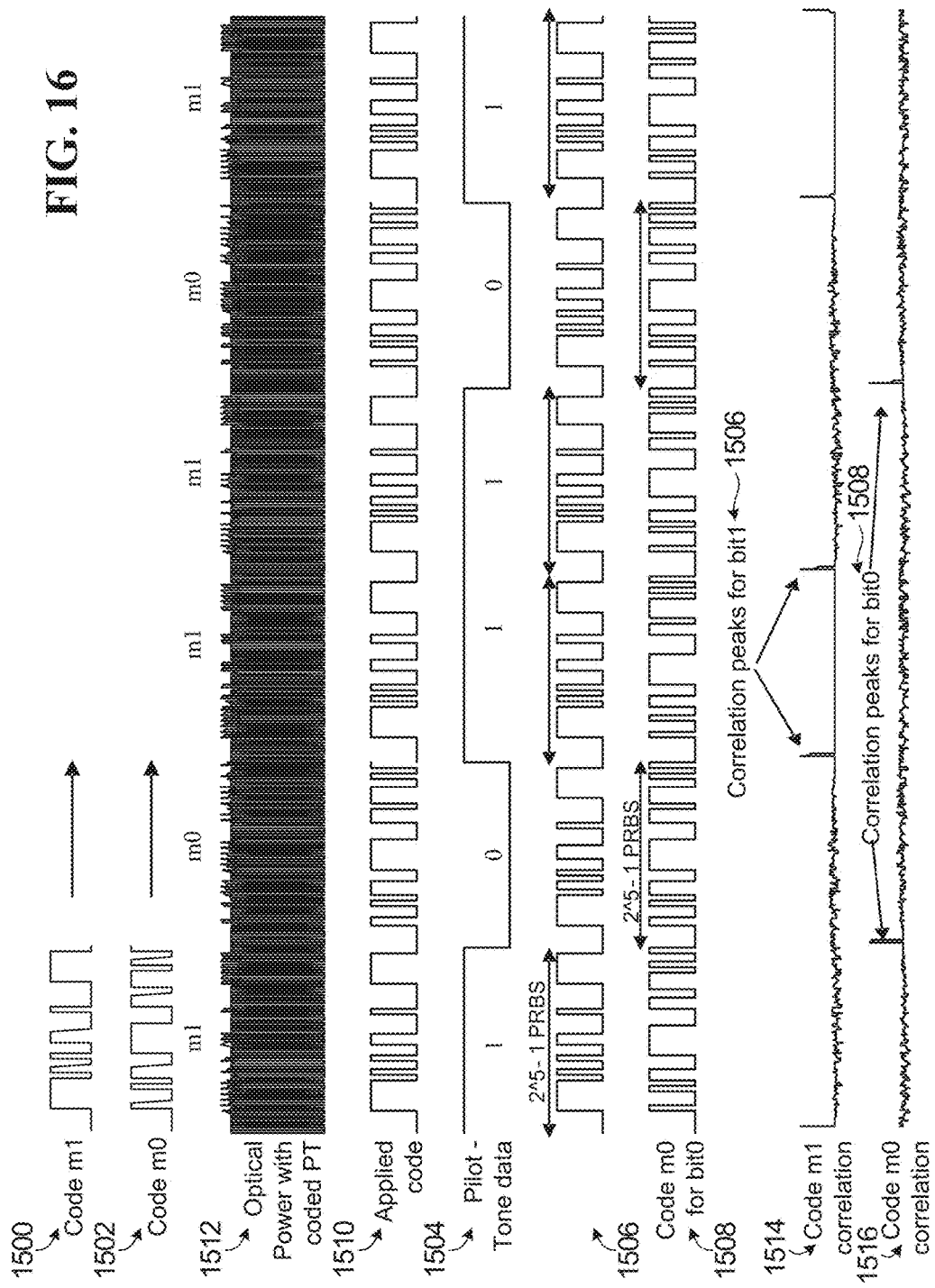
FIG. 16 shows an example of a coded pilot-tone signal, including correlation peak detection results in the absence of a wavelength conflict.

An example of a wavelength channel without a conflict will first be described with reference to FIG. 16. Shown is a code m1 1500 representing a first bit value b1 (1 in the illustrated example), and a second code m0 1502 representing a second bit value b0 (0 in the illustrated example). An example sequence of pilot tone data is given at 1504. The repeating code m1 aligned with the pilot tone data is shown at 1506, and the repeating code m0 aligned with the pilot tone data is shown at 1508. After the codes m0 and m1 are combined based on the pilot tone data, the result is an applied code 1510. This code is multiplied by a higher frequency optical signal to produce a signal with coded pilot tone at 1512. In the illustrated example, m1 and m0 each consist of one section of a pseudo-random bit sequence. Alternatively, as described in previously embodiments, longer messages that include some repetition may be employed, for example 1.25 times a pseudorandom bit sequence.

In a receiver, a sliding cyclic correlation is performed as detailed previously. Both code m1 and m0 are used to detect the existence of correlation peaks. The result of code m1 correlation is indicated at 1514 showing correlation peaks 1506 for code m1, and the result of code m0 correlation is indicated at 1516 showing correlation peaks 1508 for code m0. For the example of FIG. 16, for any pilot tone bit duration, there is only one correlation peak.

When two channels have the same wavelength, they have the same pilot-tone frequency, their optical powers can be described as:

$$I_1(t)=I_{0\_1}(1+f_{C\_1}(t)m\,\sin(\omega_{PT}t))$$

$$I_2(t)=I_{0\_2}(1+f_{C\_2}(t)m\,\sin(\omega_{PT}t))$$

The combined optical power is:

$$I(t)=I_{0\_1}(1+f_{C\_1}(t)m\,\sin(\omega_{PT}t))+I_{0\_2}(1+f_{C\_2}(t)m\,\sin(\omega_{PT}t))$$

The two channels with the same wavelength may or may not be aligned in time, and the two channels may have different optical powers.

Figure 17:
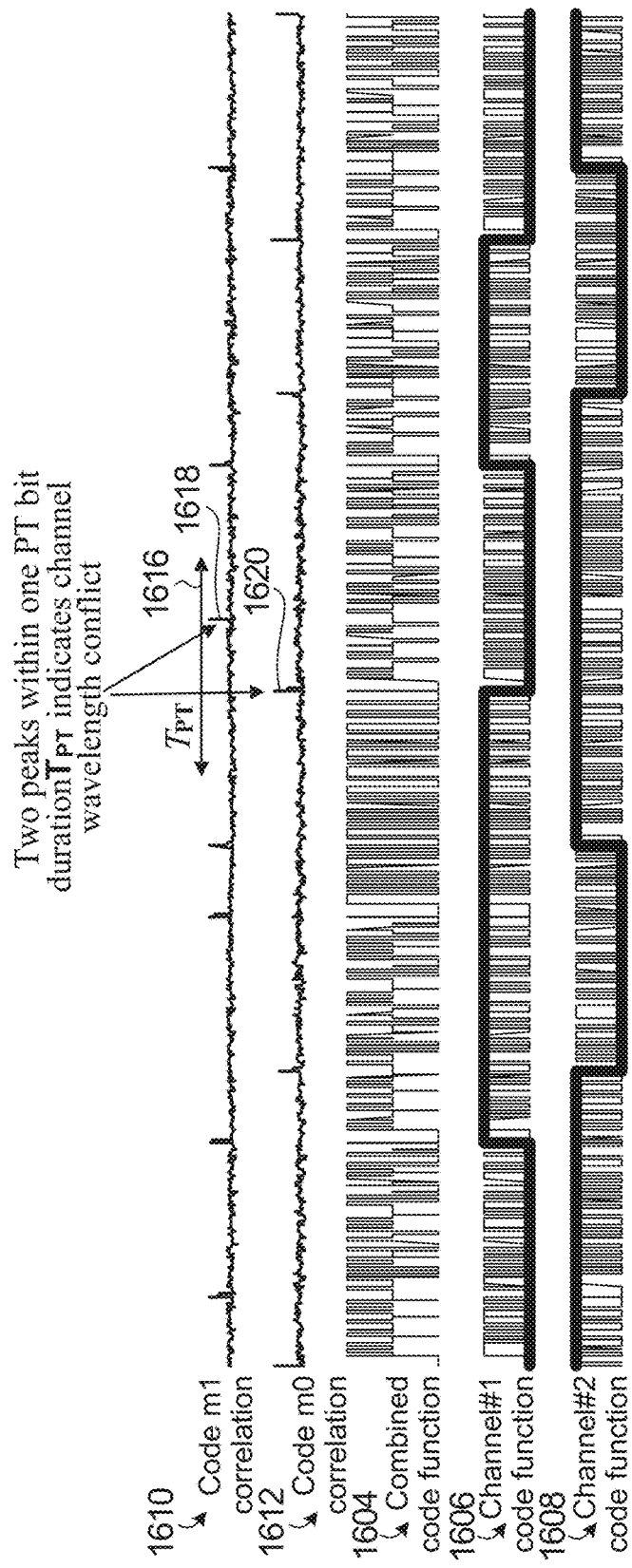
FIG. 17 shows an example correlation peak detection results in the presence of a wavelength conflict with two conflicting wavelength channels that are not time aligned.
Figure 18:
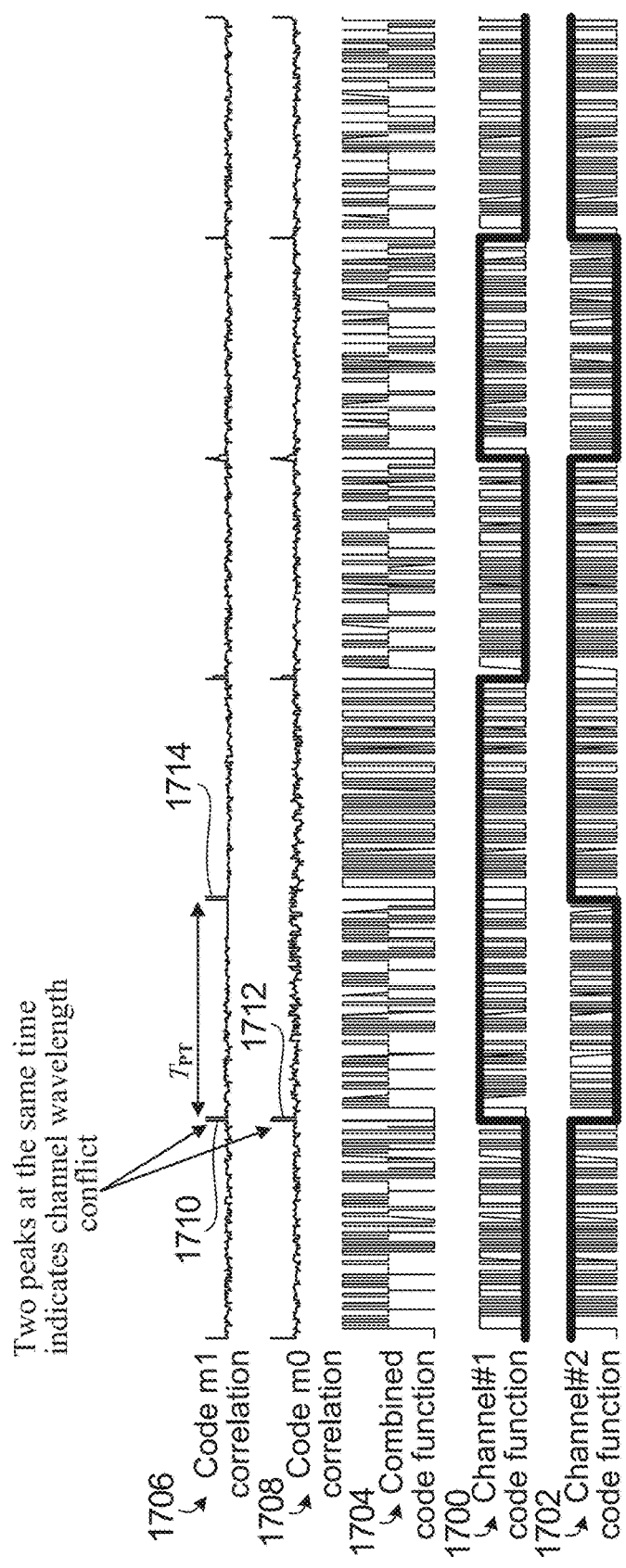
FIG. 18 shows an example correlation peak detection results in the presence of a wavelength conflict with two conflicting wavelength channels that are time aligned.

A first example of the result of combining two wavelength channels with the same wavelength is shown in FIG. 17. For the example of FIG. 17, the transitions between codewords occur at different times for a code 1606 of a first channel and a code 1608 of a second channel. As such, the first and second channels are not time aligned. The combined code function is indicated at 1604. Also shown in FIG. 16 is the result of code m1 correlation at 1610 and the result of code m0 correlation at 1612. When the bits of two channels are not time aligned, which is usually the case, there will be two correlation peaks within one pilot tone bit duration $T_{PT}$ indicated at 1616. In FIG. 17, the presence of two correlation peaks 1618, 1620 within one such bit duration $T_{PT}$ is an indication of channel conflict. A second example of the result of combining two wavelength channels with the same wavelength is shown in FIG. 18, where the code function for the first channel is indicated at 1700 and the code function for the second channel is indicated at 1702. The transitions between codewords occur at the same times for the two codes and as such the channels are time aligned. The combined code function is indicated at 1704.

Figure 19:
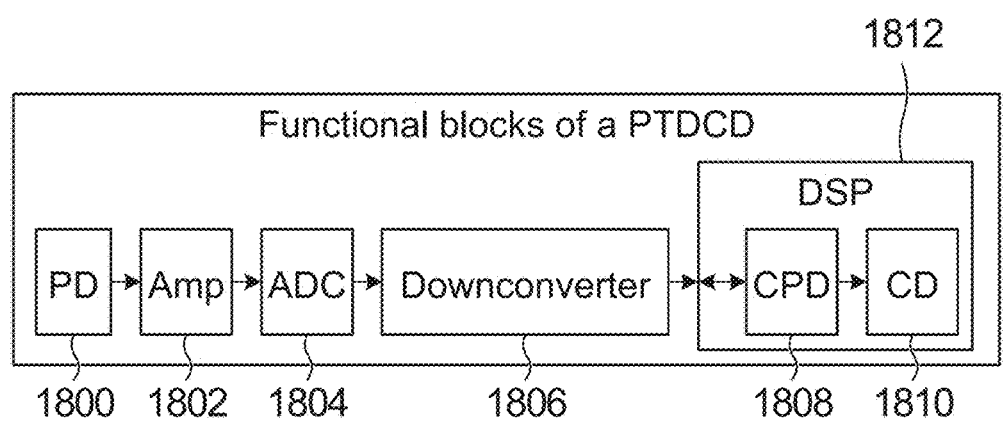
FIG. 19 is a block diagram of a pilot tone detector with conflict detection.

Also shown in FIG. 18 is the result of code m1 correlation at 1706 and the result of code m0 correlation at 1708. For the case where the bits of the two channels are time aligned, two correlation peaks, one for code m0 and one for m1 may be detected at the same time. This happens when the two channels have different pilot tone data bits. Correlation peaks 1710, 1712 are an example of simultaneous correlation peaks, one for code m1 and one for code m0. However, so long as the data of the two channels is not identical all the time, there will not always be two correlation peaks for the same code. For example, one pilot tone bit duration later than correlation peaks 1710, 1712 is shown a single correlation peak 1714 which reflects the same bit m1 present at the same time on the two channels. Because the data of the two channels is not identical all the time, some of the time there will be two correlation peaks in a bit duration (for example peaks 1710,1712) and some of the time there will be one peak in a bit duration (for example peak 1714), and on average over multiple bit durations, there will be more than one correlation peak per bit duration. When this is the case, a wavelength collision is detected. FIG. 19 is a block diagram of an example of a pilot tone detector with conflict detector. The PTDCD has a photo-detector (PD) 1800, amplifier 1802, an analog-to-digital converter (ADC) 1804, downconverter 1806, correlation peak detector (CPD) 1808, and conflict detector (CD) 1810 connected together in sequence. The CPD 1808 and the CD 1810 may, for example, be implemented together in a DSP 1812, or alternatively in a FPGA, or ASIC.

In operation, the photo-detector (PD) 1800 converts an optical signal to an electric signal. The electric amplifier 1802 amplifies the converted signal to a suitable level for further processing. The ADC 1804 converts the amplified converted signal to a digital signal. The resulting digital signal is downconverted to baseband by downconverter 1806 and then processed by the correlation peak detector (CPD) 1808 to identify correlation peaks. This is done for each pilot tone frequency. In some embodiments, the DSP 1812 includes multiple parallel processing modules, with each module responsible for detecting one pilot-tone. Each processing module is responsible for processing a pilot-tone of a particular frequency. Frequency scanning may be employed to resolve the clock frequency error between a transmitter and a PTDCD. The results produced by the CPD 1808 are processed by the CD 1810 to determine whether there is a conflict or not.

Figure 20:
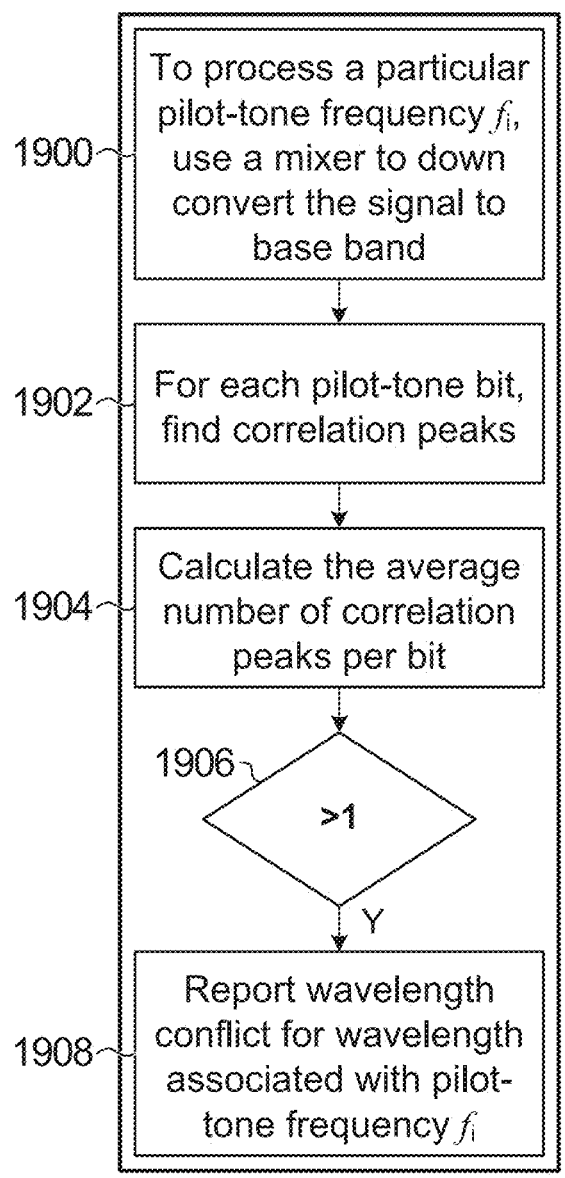
FIG. 20 is a flowchart of a method of conflict detection.

FIG. 20 is a flowchart of a method of correlation peak detection and conflict detection provided by an embodiment of the invention. This method may, for example, be implemented in the CPD 1808 and CD 1812 of FIG. 19.

Recall that the pilot tone is a low frequency modulation on top of the high speed signal and that each wavelength has a unique pilot-tone frequency. The method of FIG. 20 is performed for each pilot tone frequency, for example in a respective processing module. In block 1900, to process a particular pilot tone frequency $f_i$, a mixer is used to downconvert the signal to baseband. In block 1902, for each pilot-tone data bit, correlation peaks are found. This may involve the use of time domain correlation to find the correlation peak(s) for every pilot-tone data bit, for both codes m1 and m0. Blocks 1900, 1902 may be performed by the CPD 1808 of FIG. 19, for example.

In block 1904, the average number of correlation peaks (including peaks for codes m1 and m0) per pilot-tone bit is calculated. In block 1906, the average number of correlation peaks per bit is compared to a threshold T (the threshold is 1 in FIG. 20), and if the number is greater than the threshold, a wavelength conflict is detected. When such a conflict is detected, a wavelength conflict for the wavelength associated with the pilot-tone frequency $f_i$ is reported in block 1908. While block 1904 as described involves averaging a number of correlation peaks, more generally, for any given pilot-tone bit duration, if there are more than one correlation peak, then there must be wavelength conflict, and a conflict can be declared. However, the described averaging can optionally be employed to reduce the chance of false detection. For example, sometimes a noise peak might be treated as real correlation peak.

The conflict detection results of multiple PTDCDs can be used to determine where the conflict arose. Such a determination might be made in the OADM controller 1430 of FIG. 15, for example. At the instant depicted in FIG. 15, the PTDCD 1408 processes the pilot tone for $\lambda_k$ and finds only one correlation peak per pilot tone bit duration and concludes there is no conflict. The PTDCD 1410 will detect two correlation peaks per pilot tone bit duration, and concludes there is a conflict. The OADM controller 1430 can conclude that the conflict is caused by adding a channel in the west-east direction at coupler 1406. In some embodiments, OADM controller 1430 controls the OADM to eliminate the conflict, for example by no longer adding in $\lambda_k$ at coupler 1406. Alternatively, the OADM controller 1430 may generate a message for transmission to a higher level network controller (not shown) responsible for managing multiple nodes including the particular OADM node where the conflict was detected.

The examples above have focused on binary pilot data and as such are two sequences for bit values 0 and 1 respectively. More generally, M-ary pilot tone data may be used in which case there are M sequences each of the possible M data values over a data value periods, where $M=2^n$ and $n>=1$. In this case, correlation peak detection is performed using each of the M sequences. Using these definitions, for the described example, n=1 and M=2. In another specific embodiment, n=2, and M=4.

The threshold T used in determining whether there is a conflict is greater than one. It could be set as high as two if there is not chance of time aligned conflicting wavelength channels. Two time aligned channels will, on average, have a number of peaks per bit period that is less than two, accounting for the fact that only one peak will be detected when both channels have the same pilot tone data.

Through the descriptions of the preceding embodiments, the present invention may be implemented by using hardware only or by using software and a necessary universal hardware platform. Based on such understandings, the technical solution of the present invention may be embodied in the form of a machine readable memory which includes a number of instructions that enable a processor (for example a DSP) to execute the methods provided in the embodiments of the present invention.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   converting an optical signal to an electrical signal, the optical signal containing at least one of a plurality of possible wavelength channels, each wavelength channel that is present modulated by a pilot tone signal with a respective pilot tone frequency, the pilot tone signal carrying M-ary pilot tone data, $M=2^n$, $n \geq 1$, with a respective one of M different sequences being used to represent each of M possible data values over a data value period;
   digitizing the electrical signal;
   for each one of the plurality of possible wavelength channels performing conflict detection by:
   performing correlation peak detection using each of the M different sequences to determine correlation peaks for each of the M different sequences;
   based on the determined correlation peaks, determining whether multiple instances of the wavelength channel are present in the optical signal.

2. The method of claim 1 wherein for each wavelength channel determining whether multiple instances of the wavelength channel are present in the optical signal comprises:
   determining how many correlation peaks for the M different sequences are collectively present in a data value period;
   determining that there are multiple instances of the wavelength channel present when there are two or more correlation peaks in the data value period.

3. The method of claim 1 wherein for each wavelength channel determining whether multiple instances of the wavelength channel are present in the optical signal comprises:
   determining a respective number of correlation peaks for the M different sequences that are collectively present in each of a plurality of data value periods;
   averaging the respective numbers of correlation peaks to produce an average number of correlation peaks per data value period;
   determining that there are multiple instances of the wavelength channel present when the average number of correlation peaks is greater than a threshold T, where T>1.

4. The method of claim 1 further comprising:
   performing the correlation peak detection and performing conflict detection at both a first location and a second location;
   determining whether a conflicting wavelength channel was added between the first location and the second location when no conflict is present at the first location and a conflict is present at the second location.

5. The method of claim 4 wherein the first location and the second location are two locations within an optical add drop multiplexer node.

6. The method of claim 1 wherein performing correlation further comprises:
   performing frequency scanning to resolve a clock frequency error between a transmitter and a pilot tone detector with conflict detection performing the correlation peak detection and conflict detection.

7. The method of claim 1 wherein n=2, M=4.

8. A pilot tone detector comprising:
   a photodetector for converting an optical signal to an electrical signal, the optical signal containing at least one of a plurality of possible wavelength channels, each wavelength channel that is present modulated by a pilot tone signal with a respective pilot tone frequency, the pilot tone signal carrying M-ary pilot tone data, $M=2^n$, $n \geq 1$, with a respective one of M different sequences being used to represent each of M possible data values over a data value period;

an analog to digital converter for digitizing the electrical signal;

a correlation peak detector that performs correlation peak detection for each of the plurality of pilot tone frequencies using each of the M different sequences to determine correlation peaks for each pilot tone frequency for each of the M different sequences; and a correlation peak processor that performs conflict detection for each wavelength channel based on the determined correlation peaks.

9. The pilot tone detector of claim 8 wherein the correlation peak processor is configured to:

determine how many correlation peaks for the M different sequences are collectively present in a data value period; and determine that there are multiple instances of the wavelength channel present when there are two or more correlation peaks in the data value period.

10. The pilot tone detector of claim 8 wherein the correlation peak processor is configured to:

determine a respective number of correlation peaks for the M different sequences that are collectively present in each of a plurality of data value periods;

average the respective numbers of correlation peaks to produce an average number of correlation peaks per data value period; and determine that there are multiple instances of the wavelength channel present when the average number of correlation peaks is greater than a threshold T, where T>1.

11. The pilot tone detector of claim 8 wherein the correlation peak detector further comprises a frequency scanner configured to perform frequency scanning to resolve a clock frequency error between a transmitter and the pilot tone detector.

12. The pilot tone detector of claim 8 wherein n=2, M=4.

13. The pilot tone detector of claim 8 wherein the correlation peak detector and the correlation peak processor comprise a plurality of parallel processing modules, with each module responsible for correlation peak detection for one pilot tone frequency.

14. An optical add drop multiplexer node (OADM node) comprising:

a first pilot tone detector according to claim 8 configured to receive an optical signal and determine whether there is a wavelength conflict at a first location.

15. The OADM node of claim 14 further comprising:

a second pilot tone detector according to claim 8 configured to receive an optical signal and determine whether there is a wavelength conflict at a second location.

16. The OADM node of claim 15 further comprising:

an OADM controller configured to determine whether a conflicting wavelength channel was added between the first location and the second location when no conflict is present at the first location and a conflict is present at the second location.

17. The OADM node of claim 16 wherein the OADM controller is configured control the OADM node so as to remove the conflicting wavelength channel when it is determined that the conflicting wavelength channel was added at the OADM node.

18. The OADM node of claim 14 wherein for each pilot tone detector, the correlation peak detector further comprises a frequency scanner configured to perform frequency scanning to resolve a clock frequency error between a transmitter and the pilot tone detector.

19. The OADM node of claim 14 wherein n=2, M=4.

20. The OADM node of claim 14 wherein for each pilot tone detector, the correlation peak detector and the correlation peak processor comprise a plurality of parallel processing modules, with each module responsible for correlation peak detection for one pilot tone frequency.

* * * * *

UNITED STATES PATENT AND TRADEMARK OFFICE
CERTIFICATE OF CORRECTION

PATENT NO. : 10,003,426 B2
APPLICATION NO. : 15/336061
DATED : June 19, 2018
INVENTOR(S) : Zhiping Jiang Page 1 of 1

It is certified that error appears in the above-identified patent and that said Letters Patent is hereby corrected as shown below:

On the Title Page

A reference to the Foreign Application Priority Data is missing and should be included as shown below:
--Foreign Application Priority Data
February 19, 2016    (CN)    PCT/CN2016/074144--

Signed and Sealed this
Fourth Day of June, 2019

Andrei Iancu
*Director of the United States Patent and Trademark Office*